United States Patent [19]

Dummermuth et al.

[11] 4,038,533

[45] July 26, 1977

[54] INDUSTRIAL CONTROL PROCESSOR SYSTEM

[75] Inventors: Ernst Dummermuth, Chesterland; William A. Donze, Mentor; Timothy Bielawski, Maple Heights, all of Ohio

[73] Assignee: Allen-Bradley Company, Milwaukee, Wis.

[21] Appl. No.: 728,000

[22] Filed: Sept. 29, 1976

[51] Int. Cl.² .............................................. G06F 15/46
[52] U.S. Cl. .................................. 235/151.11; 364/900
[58] Field of Search .................. 340/172.5; 235/151.1, 235/151.11

[56] References Cited

U.S. PATENT DOCUMENTS 3,810,104  5/1974  Markley .................................. 445/1

OTHER PUBLICATIONS

"Actrion III" Publication by Actron, Div. of McDonnell Douglas, p. 4, 11-10-1976.
"If You're Working Metal it's Easier with Adapt-A-Path" General Automation Inc. Publication, 11-1-0-1976, p. 8.

*Primary Examiner*—Eugene G. Botz
*Attorney, Agent, or Firm*—Quarles & Brady

[57] ABSTRACT

An industrial control processor is employed in a numerical control system to operate the servo mechanisms on a machine tool in response to a part program stored on a tape. The industrial control processor includes unique hardware and software features which also allow it to operate as a programmable controller to control the discrete digital devices associated with the machine tool. The industrial control processor is programmed with a conventional computer type instruction set to perform numerical control functions and is programmed with a programmable controller type instruction set to perform the machine dependent logic functions. The resulting system maintains the state-of-the-art capabilities of a computer numerical control (CNC) and adds to it the flexibility and programming ease of a programmable controller.

22 Claims, 26 Drawing Figures

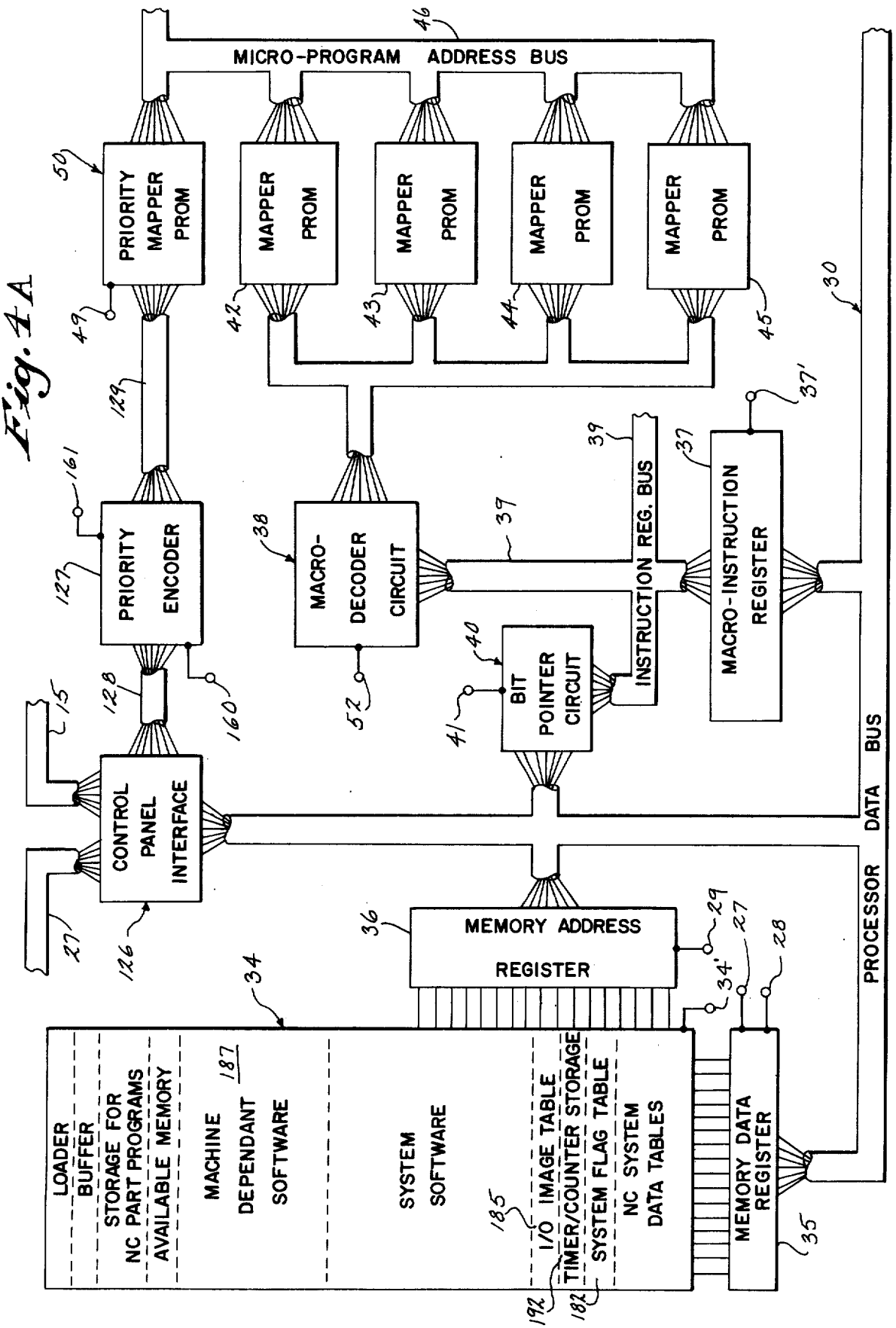

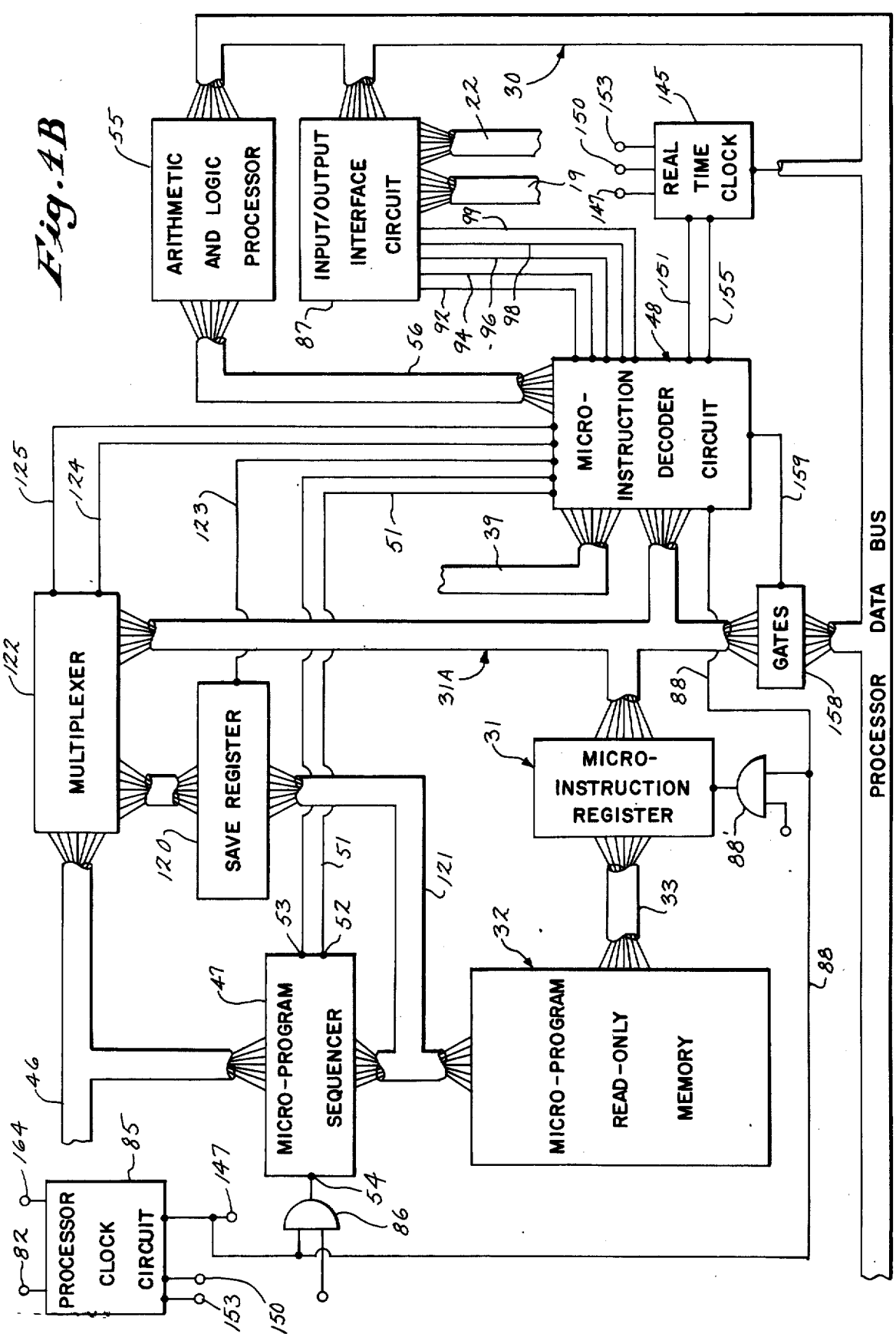

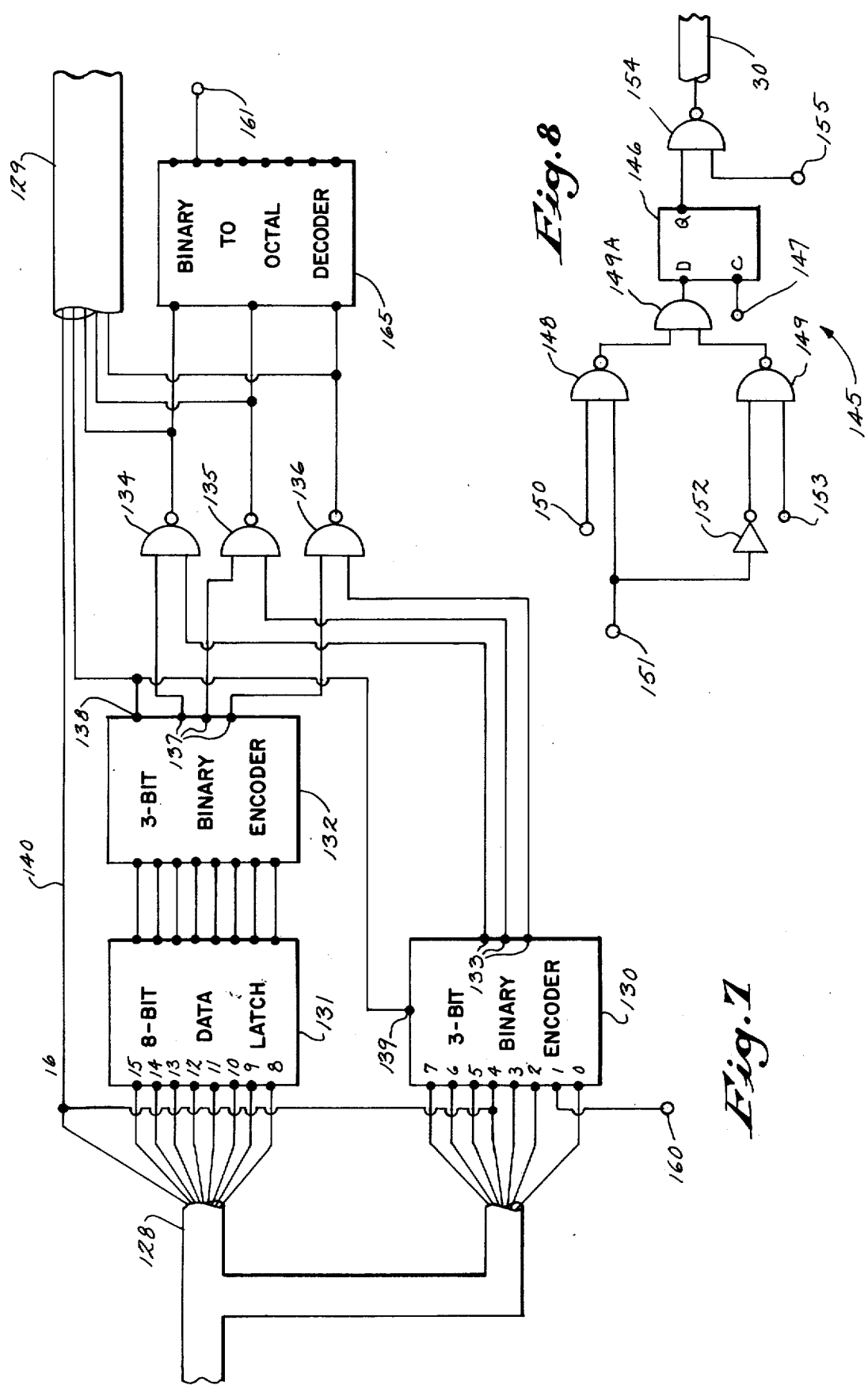

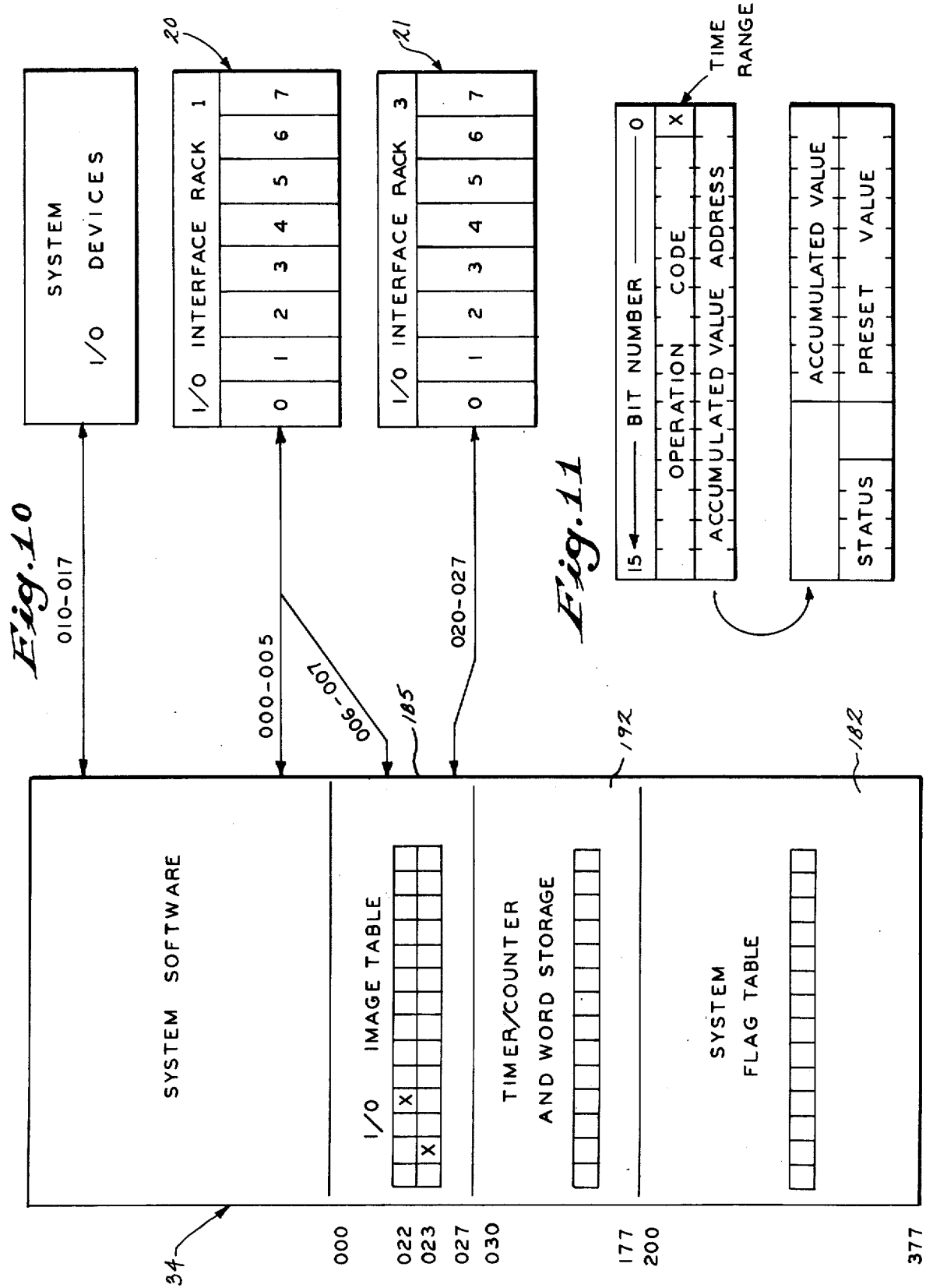

```
 34003   26415                          25015
---] [-----] [-------------------------(L)------

25015                                 25115
---] [---------------------------------(L)------

27115   02501  02502  26715           02700
---] [-----] [----] [-----] [----------(L)------
  02500   02501                         25115
---] [-----] [-------------------------(U)------
  26615   27115                          030
---] [-----] [-------------------------(TON)----
                                         0.1
                                         010
                                         000
  03015                                 02700
---] [---------------------------------(U)------

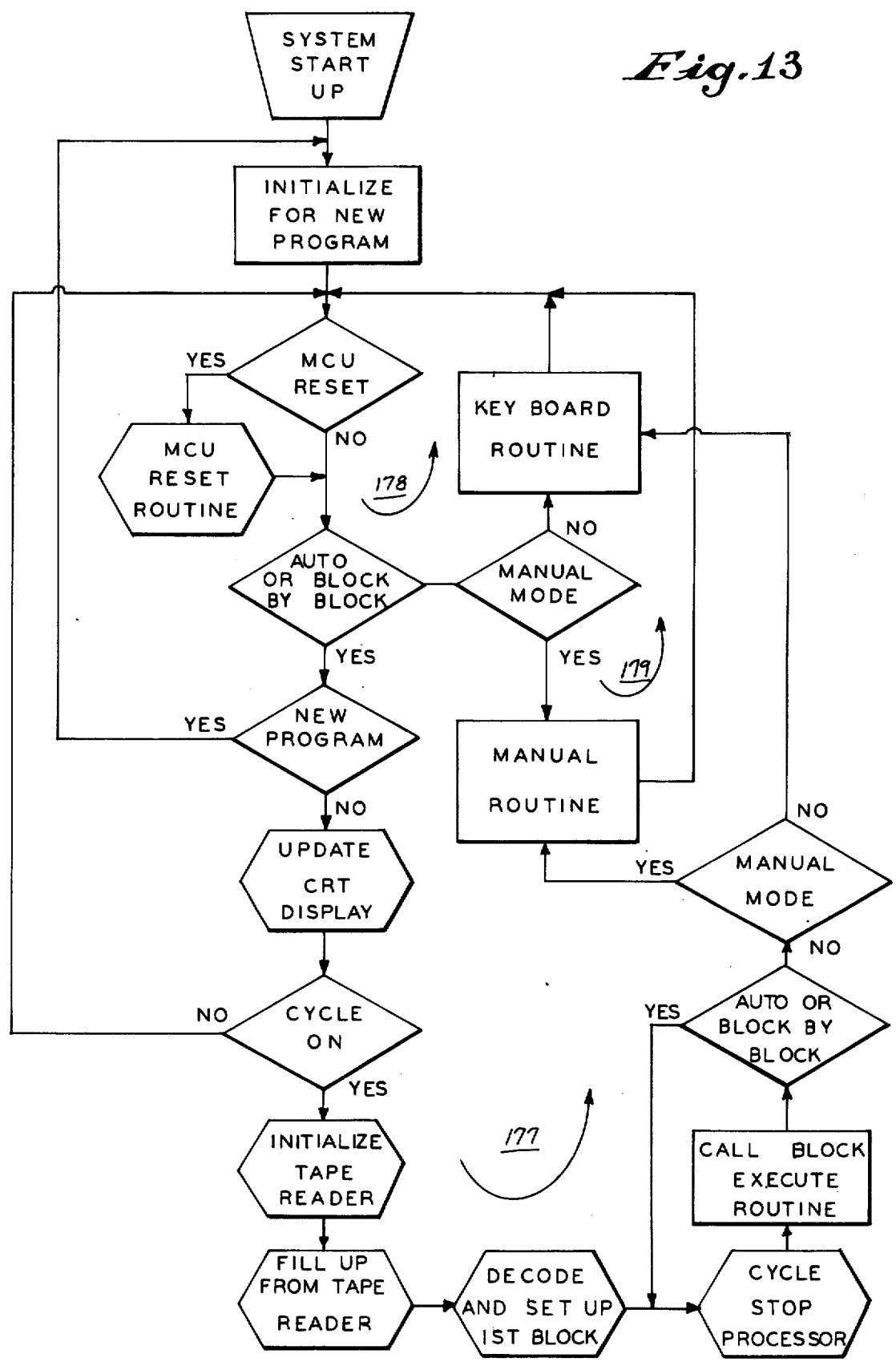

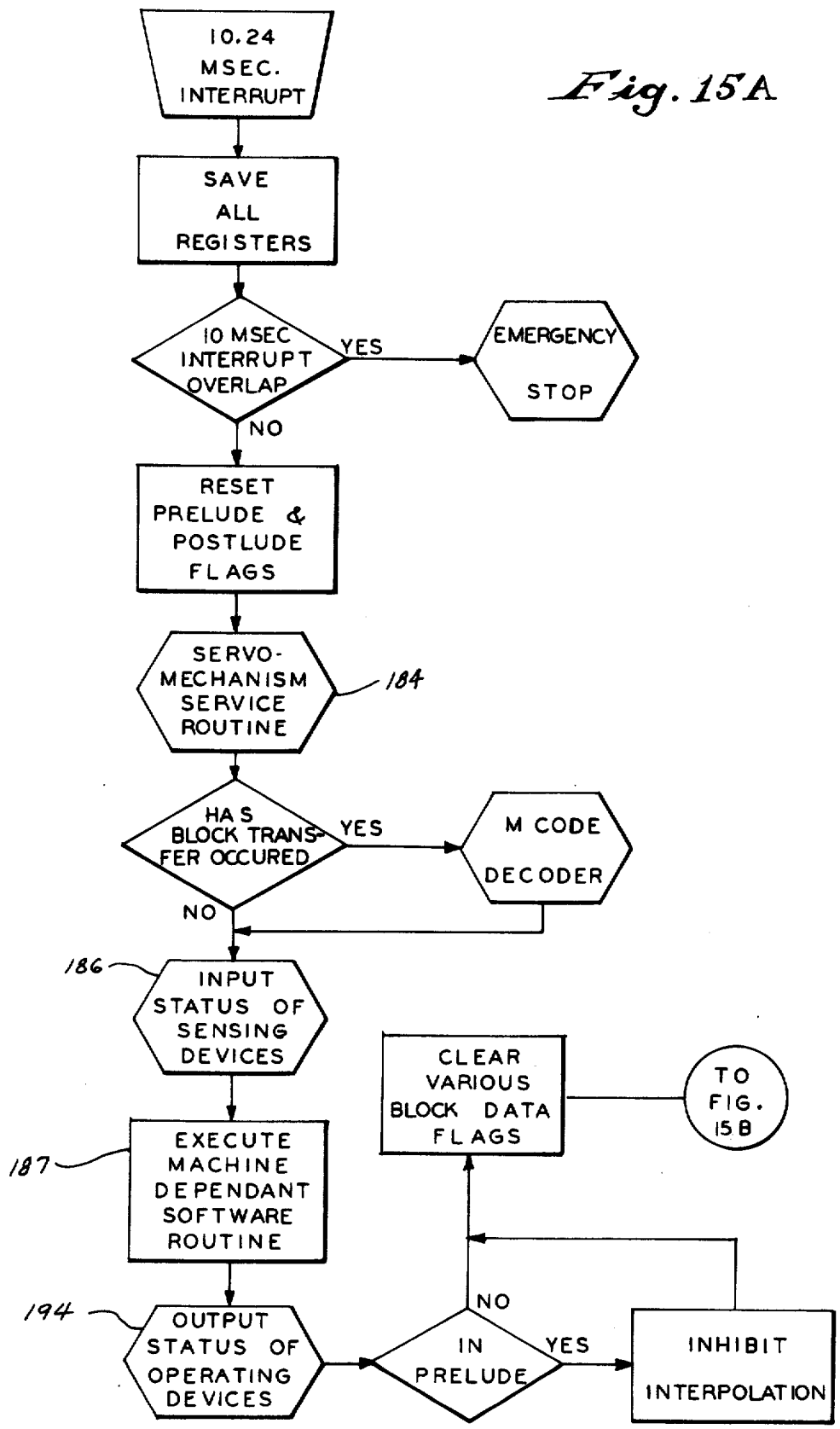

INDUSTRIAL CONTROL PROCESSOR SYSTEM

BACKGROUND OF THE INVENTION

The field of the invention is numerical control systems for machine tools, and more specifically, industrial processors which are suitable both for controlling axis position and motion on a multi-axis machine tool and for controlling the discrete, digital devices which are associated with the machine tool.

Numerical control processors have in the past taken the form of a hardwired, special purpose computer. Such hardwired computer controllers are interfaced with the servo control units on the machine tool to control the motion of a cutting tool along one or more axes and are interfaced with electromechanical relay panels or stand-alone solid state control circuits to control the discrete, digital devices which perform such auxiliary functions as tool changing and selection, pallet changing and selection, and coolant control. Each make and model of machine tool requires its own unique set of discrete digital devices and hence a unique control circuit must be designed to operate them. The machine tool builder has in the past been responsible for designing the relay panel or solid state control circuit and has been responsible for interfacing it with the numerical control system. These tasks are time consuming and add considerably to the overall cost of the machine.

As disclosed in U.S. Pat. No. 3,810,104, which is entitled "Programmable Magnetics for a Numerical Control System," the burden of interfacing a numerical control system with a particular machine tool has been substantially lessened by employing a programmable controller with the numerical control processor. The programmable controller may be easily programmed by the machine tool builder to operate the discrete digital devices on each machine tool, thus eliminating the time consuming and expensive design of special purpose hardward for each make and model. A numerical control system which employs the teachings of this United States patent is manufactured and sold by the Allen-Bradley Company, assignee of the present invention, and is identified as the Model 4500.

In more recent years general purpose digital computers have been employed as numerical control processors. "Mini-computers" such as the Model 2100A manufactured by the Hewlett-Packard Company and the Model PDP-8 manufactured by the Digital Equipment Corporation are programmed to perform numerical control functions and are interfaced both to the servo control units and the discrete digital devices on a machine tool. The programs which operate the minicomputer to perform both axis control and machine dependent logic functions are stored in the memory of the computer in machine language. To alter the operation of such a system to meet the unique requirements of a particular machine tool, therefore, the machine tool builder must employ skilled programmers who are knowledgeable of the entire "software system." In addition to the difficulties and complexities of real-time computer programming which this arrangement presents, the control of discrete digital devices with a general purpose digital computer results in considerable waste of costly memory space and valuable processor time.

SUMMARY OF THE INVENTION

The present invention relates to a processor for a numerical control system which may be programmed to operate the servo control units on a multi-axis machine tool and which may be separately programmed to perform the machine dependent logic functions. More specifically, the processor of the present invention includes first means which is responsive to a first set of macro-instructions stored in the processor memory to manipulate digital numbers and perform arithmetic functions thereon, and second means which is responsive to a second set of macro-instructions stored in the processor memory to manipulate single data bits and perform logical functions therewith. The first set of macro-instructions are of the type typically employed in general purpose digital computers whereas the second set of macro-instructions are of the type typically employed in programmable controllers. Thus, the industrial processor of the present invention is a complete integration of a numerical control processor with a programmable controller to provide complete machine control.

A general object of the invention is to provide machine dependent logic for a numerical control system which is easily programmed by the machine tool builder. A selected portion of the processor memory is set aside for instructions which perform the machine dependent logic. Such instructions are of the form commonly employed in programmable controllers and these may be entered by the machine tool builder through a keyboard associated with the system. A CRT display is also associated with the system and as machine dependent logic instructions are entered by the machine tool builder, a ladder diagram indicative of the machine dependent logic thus developed is displayed on the CRT screen. Editing functions such as those described in U.S. Pat. No. 3,813,649, entitled "Controller Program Editor," may be performed by the machine tool builder to alter the machine dependent logic program by means of the keyboard.

Another general object of the invention is to provide a digital processor which will efficiently execute instructions of the type commonly employed in general purpose digital computers as well as instructions of the type which are commonly employed in programmable controllers. This is accomplished in part by a bit pointer which is coupled to an instruction register in the processor, and in part by a real-time clock which is coupled to the processor data bus. These elements along with selected storage registers in the processor allow the direct and efficient execution of programmable controller type instructions.

The foregoing and other objects and advantages of the invention will appear from the following description. In the description reference is made to the accompanying drawings which form a part hereof, and in which there is shown by way of illustration a preferred embodiment of the invention. Such description does not necessary represent the full scope of the invention, and reference is made to the claims herein for interpreting the breadth of the invention.

BRIEF DESCRIPTION OF THE DRAWINGS

FIG. 7 is a schematic diagram of the priority encoder circuit which forms part of the industrial control processor of FIG. 4a, FIG. 8 is a schematic diagram of the real-time clock circuit which forms part of the industrial control processor of FIG. 4b, FIG. 10 is a schematic illustration of the relationship of the external I/O devices to locations in the main memory of the processor of FIG. 4a, FIG. 11 is a schematic illustration of a portion of the timer/counter and word storage of FIG. 10.

DESCRIPTION OF THE PREFERRED EMBODIMENT

Figure 1:
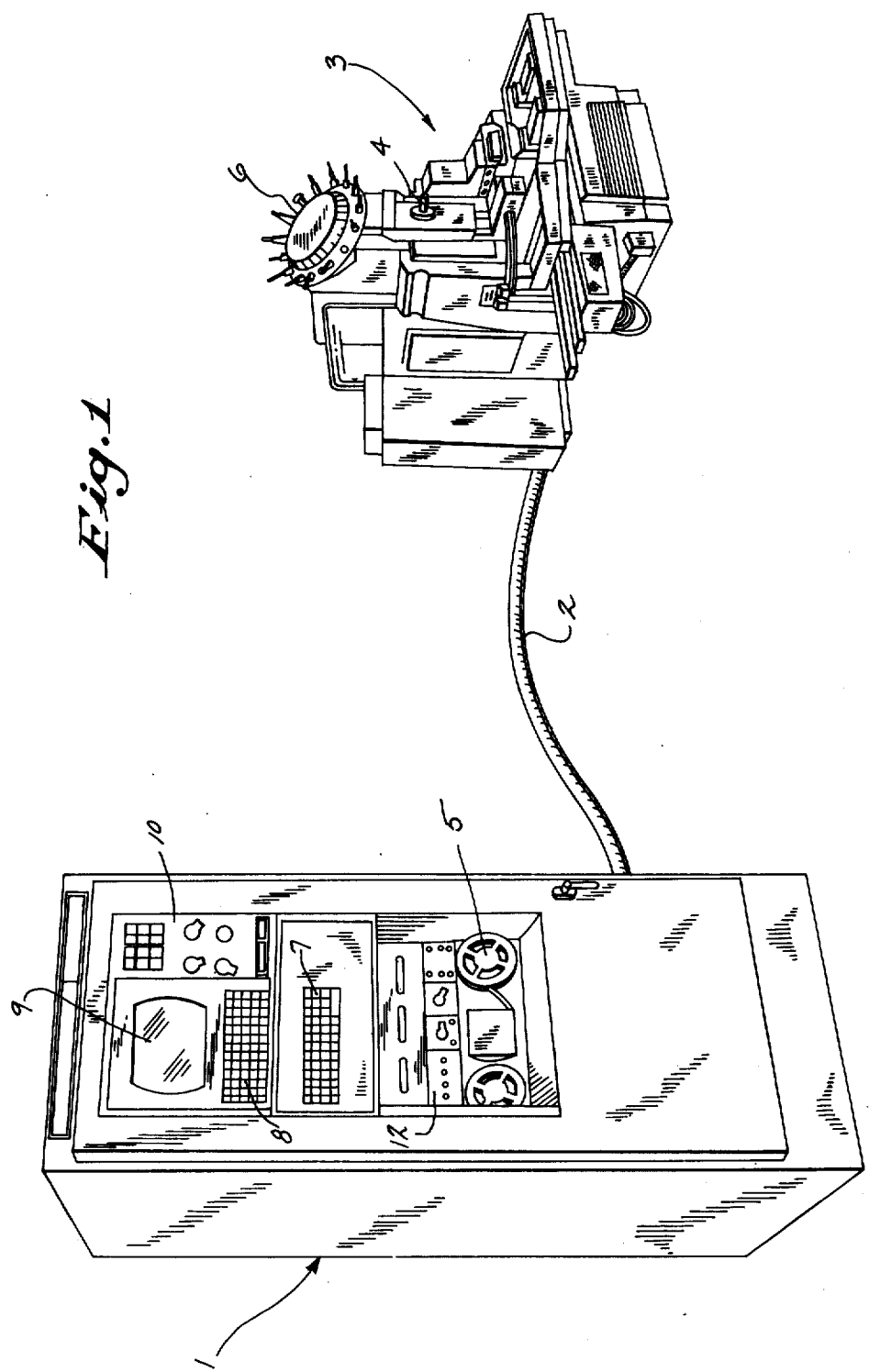
FIG. 1 is a perspective view of an enclosed numerical control system connected to a machine tool.

Referring to FIG. 1, a numerical control system is housed in a cabinet 1 and connected through a cable 2 to a multi-function machine tool with automatic tool changer 3. The numerical control system controls the motion of a cutting tool 4 along two or more axes of motion in response to a part program which is read from a tape reader 5. In addition, the numerical control system operates in response to commands read from the tape reader 5 to control auxiliary functions on the machine tool 3, such as automatic tool selection and changing from a tool magazine 6, pallet selection and changing, spindle speed and coolant operation. The implementation of such auxiliary functions involves the sensing of one-bit signals generated by numerous input devices such as limit switches, selector switches, and photoelectric cells, which are mounted to the machine tool 3, and the operation of numerous output devices such as solenoids, lights, relays and motor starters. The numbers and types of such input and output devices, as well as the manner in which they are operated, will vary considerably from machine to machine.

The numerical control system of the present invention will easily interface with machine tools of any make and model. As will be explained in detail hereinafter, this interface is accomplished by programming the numerical control system through an auxiliary keyboard 7 to selectively sense the status of the particular input devices on the machine tool to be controlled and to selectively operate the output devices thereon to provide the desired manner of operation.

Mounted to the door of the cabinet 1 immediately above the auxiliary keyboard 7 is a manual data input (MDI) keyboard 8 and associated cathode ray tube (CRT) display 9. Mounted to the right of the MDI keyboard 8 and CRT display 9 is a main control panel 10 which includes a variety of pushbuttons and selector switches for providing standard operator controls such as mode selection, feedrate override, spindle speed override, jog select, axis select, etc. One of the pushbuttons enables the keyboards 7 and 8 to enter data.

Figure 2:
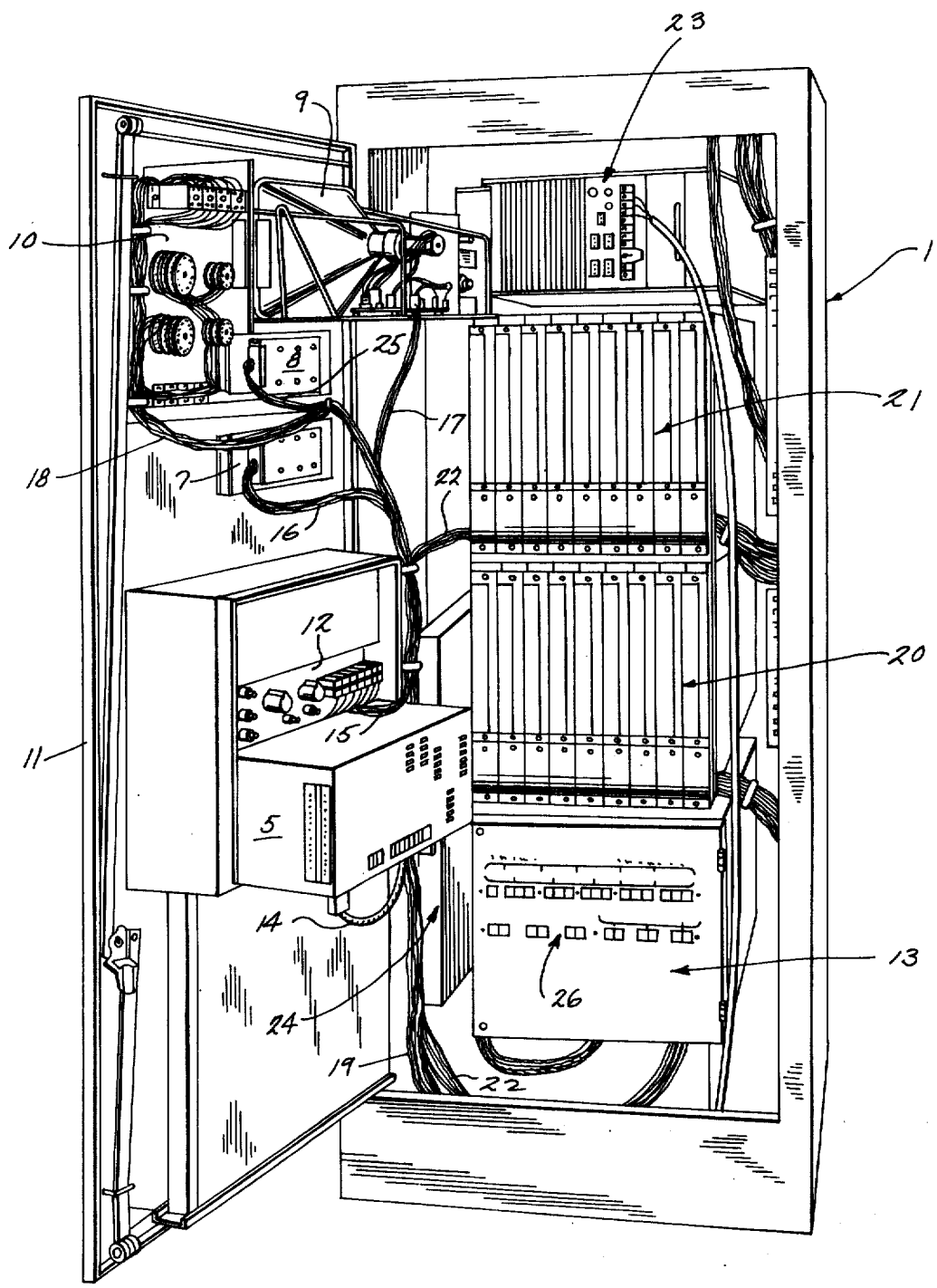
FIG. 2 is a perspective view of the numerical control system of FIG. 1 with the enclosure door open.
Figure 3:
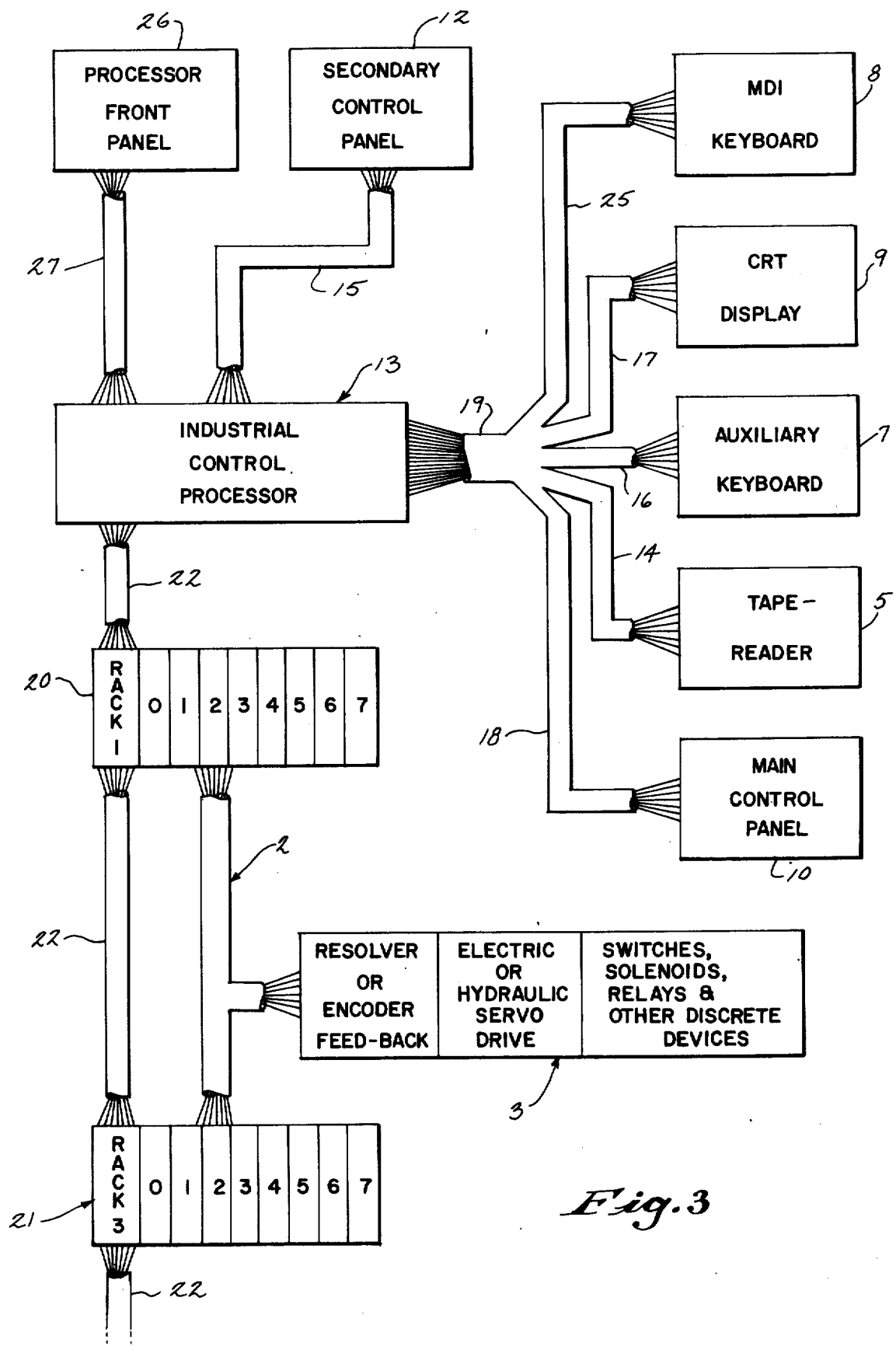
FIG. 3 is a block diagram of the numerical control system of FIG. 1, FIG. 4a and 4b are a block diagram of the industrial control processor which forms part of the system of FIG. 3.

Referring particularly to FIGS. 2 and 3, the elements of the numerical control system are mounted within the cabinet 1 to allow easy access for inspection, testing and maintenance. The keyboards 7 and 8 are mounted to the cabinet door 11 along with the tape reader 5, CRT display 9 and main control panel 12 mounts immediately above the tape reader 5 and all of these system I/O devices are connected to an industrial control processor 13 which is housed at the bottom of the cabinet 1. More specifically, the tape reader 5 connects through a cable 14, the secondary control panel 12 connects through a cable 15, the auxiliary keyboard 7 connects through a cable 16, the CRT display 9 connects through a cable 17, and the main control panel 10 connects through a cable 18 to a wire harness 19 which leads to the industrial control processor 13. A processor front panel 26 provides a number of manually operable pushbuttons and visual indicators which relate to the operation of the processor 13 and which are connected thereto through a bus 27.

Two input/output (I/O) interface racks 20 and 21 are mounted in the cabinet 1 above the processor 13 and are connected thereto by a wiring harness 22 which extends upward along their left-hand side. A main power supply 23 mounts above the I/O interface rack 21 and a memory power supply 24 mounts on the left side wall of the cabinet 1.

The I/O interface racks 20 and 21 mount a variety of input circuits and output circuits on closely spaced, vertically disposed printed circuit boards (not shown in the drawings). These input and output circuits serve to couple the industrial control processor 13 with the cable 2 that leads to the machine tool 3 and may include input circuits for sensing the status of limit, selector and pushbutton switches such as that disclosed in U.S. Pat. No. 3,643,115 entitled "Interface Circuit for Industrial Control Systems," and output circuits for driving solenoids and motors such as that disclosed in U.S. Pat. No. 3,745,546 entitled "Controller Output Circuit." The input circuits also include position feedback accumulators which receive feedback data from the position transducers on the machine tool 3 and the output circuits include registers for providing axis motion command words to the machine tool servo mechanisms. For a more detailed description of the mechanical aspects of the I/O interface racks 20 and 21, reference is made to copending U.S. patent application Ser. No. 562,247 entitled "Disconnect Arm for Electrical Equipment." The single bay cabinet 1 with the two I/O interface racks 20 and 21 will serve a typical three-axis machine tool; however, when a larger system is required, up to five additional I/O interface racks may be mounted in adjacent cabinets to provide additional input/output capacity.

Referring particularly to FIGS. 4a and 4b, the industrial control processor 13 is organized around a 16-bit bidirectional processor data bus 30. Data is moved from one element of the processor to another through this data bus 30 in response to the execution of a micro-instruction which is held in a 24-bit micro-instruction register 31. Each such micro-instruction indicates the source of the data to be applied to the data bus 30, the destination of the data, and any operations that are to be performed on that data. The micro-instructions are stored in a micro-program read-only memory 32, and one is read out every 200 nanoseconds through a bus 33 to the micro-instruction register 31. The read-only memory 32 stores a large number of separately addressable, or selectable, micro-routines, each of which is comprised of a set of micro-instructions. To enable the processor 13 to perform a desired function, the appropriate micro-routine is stored in the read-only memory 32 and it is selected for execution by a 16-bit macro-instruction which is stored in a read/write main memory 34.

The main memory 34 is comprised of 4K by 1 dynamic MOS RAMs which are organized to store up to 32,000 16-bit words. Macro-instructions and data are read out of and written into the main memory 34 through a 16-bit memory data register 35 which connects to the processor data bus 30. The memory words are selected, or addressed, through a 15-bit memory address register 36 which also connects to the processor data bus 30. To write into the main memory 34, an address is first loaded into the memory address register 36 by applying a logic high voltage to its clock lead 29. The data to be loaded appears on the processor data bus 30 and is gated through the memory data register by applying a logic high voltage to its data in clock lead 27. A logic high voltage is then applied to a read/write control line 34' on the memory 34 to complete the loading operation. Data or a macro-instruction is read out of an addressed line of the main memory 34 when a READ micro-instruction is executed. A logic low voltage is applied to the read/write control line 34' and a logic high voltage is applied to a data out enable line 28 on the memory data register 35. The data word is momentarily stored in the register 35 and is subsequently transferred through the processor data bus 30 to the desired destination.

In response to the execution of a micro-routine called FETCH, which includes the READ micro-instruction, a macro-instruction is read from the main memory 34 and coupled to a 16-bit macro-instruction register 37 through the data bus 30. The macro-instruction is stored in the register 37 by a logic high voltage which is applied to a macro-instruction register clock line 37'. Certain of the macro-instructions include operation codes which are coupled through an instruction register bus 39 to a macro-decoder circuit 38, and other instructions also include a bit pointer code which is coupled through the same instruction register bus 39 to a bit pointer circuit 40. The bit pointer circuit 40 is a binary decoder having four inputs connected to the least significant digit outputs of the macro-instruction register 37 and having a set of 16 outputs connected to respective leads in the processor data bus 30. In response to the execution of a selected mirco-instruction (MASK), a logic high voltage is applied to a terminal 41, and the bit pointer circuit 40 drives a selected one of the sixteen leads in the processor data bus 30 to a logic low voltage. The bit pointer circuit 40 facilitates the execution of certain programmable controller type macro-instructions as will be described hereinafter.

In response to an operation code in a macro-instruction stored in the register 37, one of the micro-routines in the read-only memory 32 is selected. The operation code is applied to the macro-decoder circuit 38 which enables one of four mapper proms 42–45 and addresses a selected line in the enabled mapper prom. Each line of the mapper proms 42–45 stores a 12-bit micro-routine starting address, which when read out, is coupled through a micro-program address but 46 to preset a 12-bit micro-program sequencer 47. The sequencer 47 is a presettable counter which includes a load terminal 52, an increment terminal 53 and a clock terminal 54. The clock terminal 54 is driven by a 5-megahertz clock signal which is generated by a processor clock circuit 85 that is coupled to the sequencer 47 through an AND gate 86. Each time a logic high clock pulse is applied to the terminal 54 on the micro-program sequencer 47, it is either preset to an address which appears on the bus 46 or it is incremented one count. Concurrently, the micro-instruction register 31 is clocked through a line 88 and AND gate 88' to read and store the micro-instruction which is addressed by the micro-program sequencer 47. The AND gates 86 and 88 can be disabled in response to selected codes in a micro-instruction to decouple the 5 mhz. clock. Such decoupling of the clock 85 from the sequencer 47 occurs, for example, during input and output operations to allow data 1 micro-second to propagate.

Each mirco-instruction which is read out of the read-only memory 32 to the micro-instruction register 31 is coupled through a micro-instruction bus 31a to a micro-instruction decoder circuit 48 which is also coupled to the clock line 88. The micro-instructions are decoded and executed before the next clock pulse is applied to the terminal 54 on the micro-program sequencer 47. As will be described in detail hereinafter, each micro-instruction is comprised of a plurality of separate codes called micro-orders which are each separately decoded to enable one of the processor elements.

Each micro-routine stored in the micro-program read-only memory 32 is terminated with a special micro-instruction which includes a code, or micro-order, identified hereinafter by the mnemonic EOX or EOXS. When coupled to the micro-instruction decoder circuit 48, this code causes a logic high voltage to be generated on an EOX line 49 to a priority mapper prom 50. If the industrial control processor 13 is in the RUN mode, the starting address of the FETCH micro-routine is read from the priority mapper prom 50 and is applied to the micro-sequencer 47 through the bus 46. The micro-instruction decoder circuit 48 also generates a logic high voltage on a preset line 51 which connects to the load terminal 52 on the micro-program sequencer 47 to preset the sequencer 47 to the starting address of the FETCH micro-routine.

As indicated above, the FETCH micro-routine functions to read the next macro-instruction to be executed from the main memory 34, couple it to the macro-instruction register 37, and initiate the execution of that macro-instruction. The last micro-instruction in the FETCH micro-routine includes a code which is identified hereinafter by the mnemonic MAP. This micro-instruction code causes the micro-instruction decoder circuit 48 to generate a logic high voltage to the macro-decoder circuit 38 through a MAP line 52 and to thereby initiate decoding of the macro-instruction which is stored in the macro-instruction register 37. A logic high voltage is also generated on the preset line 51 to load the micro-program sequencer 47 with the starting address of the micro-routine called for by the decoded macro-instruction. The listing of the FETCH micro-routine is provided hereinafter in the micro-routine appendix.

Figure 5:
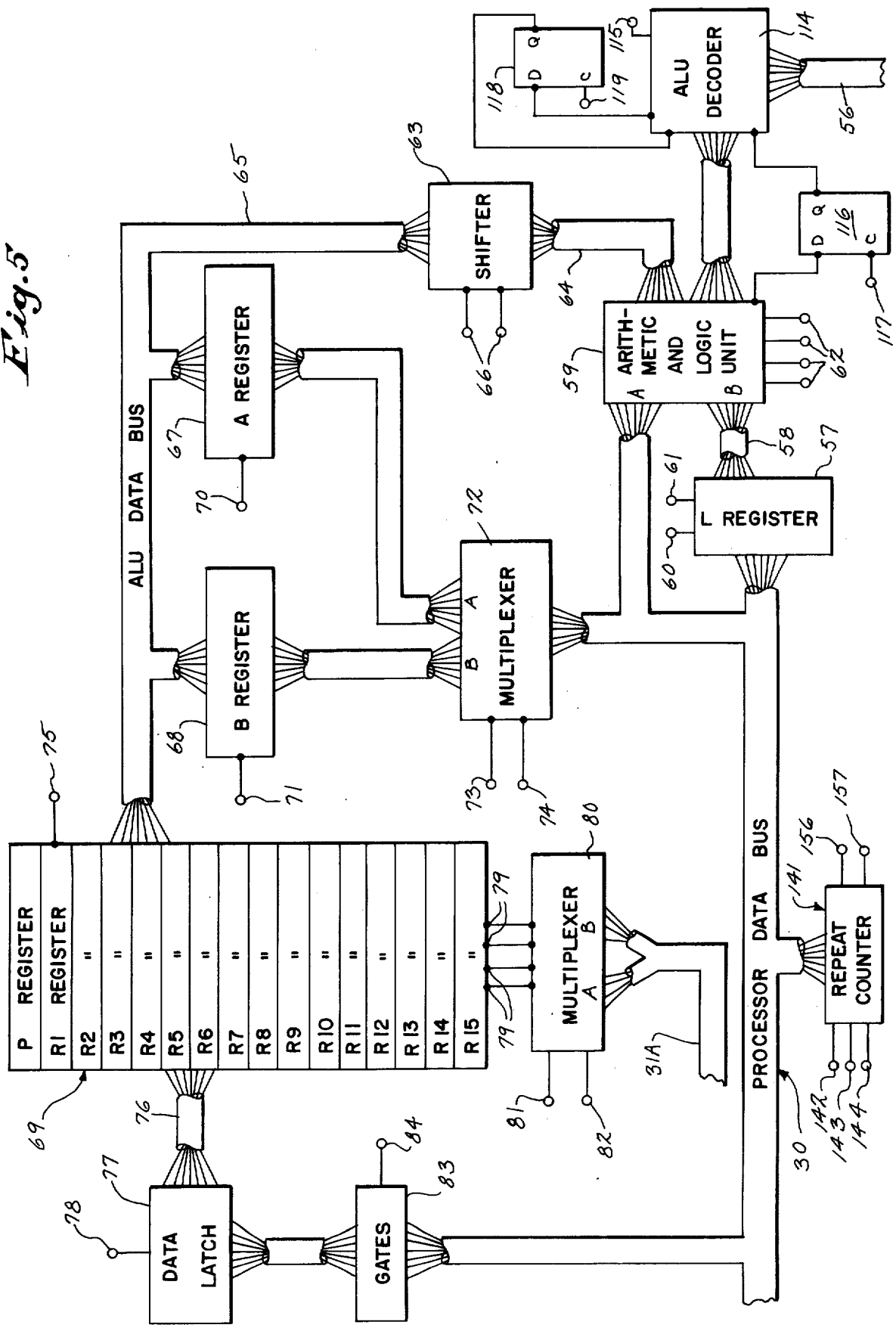
FIG. 5 is a block diagram of the arithmetic and logic processor which forms part of the industrial control processor of FIG. 4b.

As shown in FIG. 4b, mathematical and logical operations are performed by the industrial control processor 13 in an arithmetic and logic processor 55 which connects to the processor data bus 30 and to the micro-instruction decoder circuit 48 through a bus 56. Referring particularly to FIG. 5, the arithmetic and logic processor 55 includes a 16-bit "L" register 57 which has inputs that connect to the leads in the processor data bus 30 and a corresponding set of outputs which connect through a bus 58 to the "B" inputs of a sixteen-bit arithmetic and logic unit (ALU) 59. Data on the bus 30 is clocked into the L register 57 when a logic high is applied to a lead 60 and the L register 57 is cleared when a logic high is applied to a lead 61. The leads 60 and 61 connect to the micro-instruction decoder circuit 48 through the bus 56 and are thus controlled by selected micro-instructions.

The ALU 59 is comprised of four commercially available arithmetic logic units combined with a commercially available full carry look-ahead circuit to perform high speed functions such as add, substract, decrement and straight transfer. The ALU 59 has a set of 16 "A" inputs which connect directly to the leads in the processor data bus 30 and a set of four function-select lines 62 which connect to the micro-instruction decoder circuit 48 through the bus 56. In response to selected micro-instructions, the ALU 59 performs functions on data applied to its A and B inputs and generates the 16-bit results to a shifter circuit 63 through a bus 64.

Also, the ALU 59 generates signals to an ALU decoder 114 which indicate when the result of a logical or arithmetic function is zero, all "ones," odd, negative, or when it causes an overflow or a carry. The existence of such a condition is separately tested by micro-orders, or codes in micro-instructions which enable the ALU decoder 114 through the bus 56. The existence of the tested condition results in the generation of a logic high on a skip line 115 which connects to the decoder 48.

The existence of an overflow condition in the ALU 59 can also be stored in an overflow flip-flop 116 when a logic high is applied to its clock terminal through a line 117 by the decoder circuit 48. The Q output on the flip-flop 116 connects to the ALU decoder 114 and its condition can be tested by an appropriate micro-order. A system flag flip-flop 118 connects to the ALU decoder 114 and it can be clocked in response to an appropriate micro-order through a line 119 from the micro-instruction decoder 48. The flag flip-flop 118 may be set in response to one of the tested ALU conditions, and its state, or condition can in turn be tested by an appropriate micro-order acting through the ALU decoder 114.

The shifter circuit 63 is comprised of eight commercially available, dual four-line-to-one-line data selectors having their inputs connected to selected leads in the bus 64. Sixteen outputs on the shifter 63 connect to a 16-lead ALU data bus 65 and a pair of control leads 66 connect it to the micro-instruction decoder circuit 48. In response to selected micro-instructions, the shifter 63 passes the 16-bit data word from the ALU 59 directly to the ALU data bus 65, or it shifts or rotates that data one or four bits.

The 16-bit data word on the ALU bus 65 is coupled to a 16-bit A register 67, a 16-bit B register 68, or a random access memory bank 69. The data is clocked into the A register 67 by applying a logic high voltage to a lead 70 which connects the A register 67 to the micro-instruction decoder circuit 48, or the data is clocked into the B register 68 by applying a logic high voltage to a lead 71 which connects the B register 68 to the micro-instruction decoder circuit 48. The 16-outputs of the A register 67 connect to the A inputs on a 16-bit multiplexer 72 and the 16 outputs on the B register 68 connect to the B inputs on the multiplexer 72. Sixteen outputs on the multiplexer 72 connect to the leads in the processor data bus 30, and when a logic high voltage is applied to an enable lead 73 thereon, the contents of either the A register 67 or the B register 68 are coupled to the processor data bus 30. The selection is made through a select lead 74 which, along with the enable lead 73, connect to the micro-instruction decoder circuit 48. In response to the execution of selected micro-instructions, therefore, the A register 67 or the B register 68 may provide the source of data to the processor data bus 30 through the multiplexer 72, or they may be designated by selected micro-instructions as the destination of data on the processor bus 30 which is coupled through the ALU 59 and the shift circuit 63.

The random access memory 69 is comprised of four commercially available 64-bit (16×4) random access memories which are arranged to provide 16 16-bit registers identified hereinafter as the "P" register and the R1–R15 registers. A 16-bit data word is written into the random access memory 69 from the ALU data bus 65 when a logic high voltage is applied to a read-write line 75. On the other hand, the contents of one of the 16 registers in the memory 69 are read out through a bus 76 to a 16-bit data latch 77 when the line 75 is at a logic low voltage and the data latch 77 stores this word when a logic high voltage is applied to its clock line 78. The lines 75 and 78 connect to the micro-instruction decoder circuit 48 and both the random access memory 69 and the data latch 77 are thus responsive to selected micro-instructions.

The particular register in the random access memory 69 which is to be accessed is determined by a four-bit address code which is applied to a set of terminals 79. The address terminals 79 are connected to the outputs of a four-bit multiplexer 80 which has a set of A inputs connected to receive bits 4–7 of the micro-instruction (source field) and a set of four B inputs which are connected to receive bits 9–12 of the micro-instruction (destination field) through the micro-instruction bus 31a. The multiplexer 80 is enabled through a lead 81 which connects to the micro-instruction decoder circuit 48 and the four-bit address on the A or B inputs is selected by the logic signal applied to a lead 82 which connects to receive a 5 mhz. "destination" signal from the clock circuit 85. As will become more apparent from the description to follow, when the random access memory 69 is identified as the source of data, the address of the particular register in the memory 69 from which the data is to be read appears at the A inputs of the multiplexer 80, and when the random access memory 69 is identified as the destination of data, the address of the particular register into which the data is to be written appears on the B inputs.

Data read from the random access memory 69 and stored in the data latch 77 is coupled to the processor data bus 30 by a set of 16 gates 83. The gates 83 are enabled through a lead 84 which connects to, and is controlled by, the micro-instruction decoder circuit 48. For example, the P register in the memroy 69 serves as the macro-program counter, and when the FETCH micro-routine is executed, the contents of the P register is read out through the data latch 77 and the gates 83 to the processor data bus 30 where it is coupled to the main memory address register 36.

The arithmetic and logic processor 55 also includes an eight-bit binary repeat counter 141 which has its inputs connected to the eight least significant digit leads in the processor data bus 30. A constant can be loaded into the repeat counter 141 by a micro-order which designates it as the destination of the data and which enables it through an enable lead 142. The same micro-order generates a logic high voltage to a preset terminal through a lead 143. The repeat counter 141 can be incremented through a lead 144 and an output signal is generated on respective leads 156 and 157 when a count of 15 or 255 is reached. The leads 142-144, 156 and 157 connect to the micro-instruction decoder 48.

Figure 6:
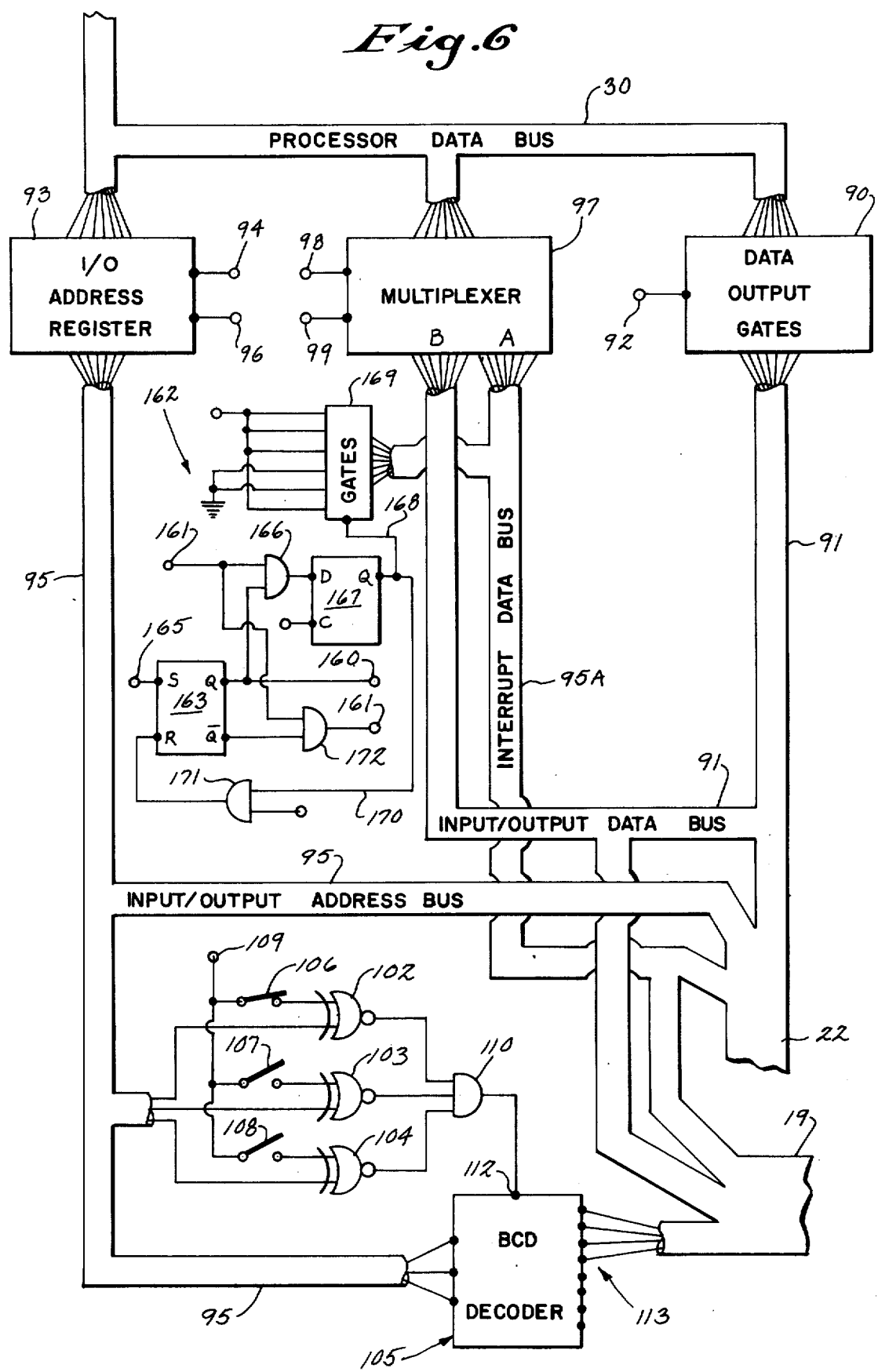
FIG. 6 is a block diagram of the input/output circuitry which forms a part of the industrial control processor of FIG. 4b.

Referring again to FIGS. 3 and 4b, data is coupled to and is received from the I/O interface racks 20 and 21 and the system I/O devices 5, 7, 8, 9 and 10 through an input/output interface circuit 87 which connects to the processor data bus 30. Referring particularly to FIG. 6, the I/O interface circuit 87 includes a set of sixteen data output gates 90 which have inputs connected to the leads in the processor data bus 30 and outputs which connect to a sixteen-bit input/output data bus 91. An enable line 92 connects a second input on each of the data output gates 90 to the micro-instruction decoder circuit 48, and when driven to a logic high voltage, a 16-bit data word on the processor data bus 30 is coupled to the input/output data bus 91. The input/output data bus 91 connects to the wiring harness 19 and 22 which couple the industrial control processor 13 to the interface racks 20 and 21 and to the respective system I/O devices such as the CRT display 9.

The input/output inerface circuit 87 also includes a six-bit input/output address register 93 which connects to the six least significant digit leads in the processor data bus 30. The I/O address register 93 connects to the micro-instruction decoder circuit 48 through a clock lead 94 and when a logic high voltage is generated on the clock lead 94, a six-bit I/O address is clocked into the register 93 from the processor data bus 30. Six output terminals on the register 93 connect to leads in a six-bit I/O address bus 95. The I/O address bus 95 joins the wiring harness 22, and the I/O address stored in the register 93 is thus coupled through the bus 95 to the I/O interface racks 20 and 21. A clear line 96 connects the address register 93 to the micro-instruction decoder circuit 48, and when a logic high voltage is generated thereon, the register 93 is reset to zero. As will be described in more detail hereinafter, when an OTA macro-instruction is executed, the I/O address (rack number and slot number) is loaded into the output address register 93 and is applied to the I/O address bus 95. The addressed device acknowledges receipt of its address and a sixteen-bit data word may then be applied to the processor data bus 30 and gated onto the input/output data bus 91 to the addressed device. Reference is made to the programmed data output micro-routine in the micro-routine appendix.

Data is coupled into the industrial control processor 13 through a 16-bit multiplexer 97 which forms part of the input/output interface circuit of FIG. 6. A set of 16 B input terminals on the multiplexer 97 connect to the input/output data bus 91 and a set of 16 output terminals thereon connect to the respective leads in the processor data bus 30. The six least significant digit inputs of a set of 16 A inputs on the multiplexer 97 connect to an interrupt address bus 95a. An enable line 98 and a select line 99 on the multiplexer 97 connect to the micro-instruction decoder circuit 48. When a logic high voltage is generated on the enable line 98, the data on either the I/O data bus 91 or the interrupt address bus 95a is coupled to the processor data bus 30. The selection is made by the logic state of the select line 99 which is also controlled by selected micro-instructions through the decoder circuit 48.

Decoding of the I/O address for the system I/O devices 5, 7, 8, 9 and 10 is accomplished in the input/output interface circuit of FIG. 6. The three most significant digit leads of the input/output address bus 95 connect to the respective inputs on three exclusive NOR gates 102-104 and the three least significant digit leads therein connect to the inputs of a BCD decoder 105. A second input on each of the exclusive NOR gates 102-104 connects through respective switches 106-108 to a logic low voltage supply terminal 109 and an output terminal on each of the gates 102-104 connects to respective inputs on an AND gate 110. An output on the AND gate 110 connects to an enable terminal 112 on the BCD decoder 105, and when a logic high voltage is generated thereat, the three-bit binary coded decimal number applied to the inputs of the decoder 105 is decoded. As a result, a logic low voltage is generated at one of eight terminals 113, the five least significant of which connect to the respective system I/O devices 5, 7, 8, 9 and 10 through the wire harness 19. The three switches 106-108 are set to indicate the rack number (which in the preferred embodiment is number 1), and when this number appears on the three most significant digit leads of the I/O address bus 95, one of the system I/O devices is addressed.

The input/output interface circuit 87 of FIG. 6 also includes a timed interrupt circuit 162. The circuit 162 includes an R-S flip-flop 163 having a set terminal connected through a lead 164 to the processor clock circuit 85 (FIG. 4b). Every 10.25 milliseconds a logic high clock pulse is applied to set the flip-flop 163 and a logic high voltage is generated at its Q output terminal and applied to an interrupt request line 160. The interrupt request line connects to a priority encoder circuit 127 (FIG. 4a) as will be described hereinafter, and when the interrupt is granted, a logic high voltage is generated on an interrupt acknowledge line 161. The interrupt acknowledge signal is gated through an AND gate 166 and clocked into a d-c flip-flop 167. A Q output on the d-c flip-flop 167 connects through a lead 168 to one input on each of six AND gates 169 and through a lead 170 to an AND gate 171. The outputs of the AND gates 169 connect to the respective leads in the interrupt address bus 95a and their respective second input terminals are connected to logic high and logic low voltage sources in such fashion as to generate the octal address seventeen on the bus 95a when the d-c flip-flop 167 is set. Thus, every 10.24 milliseconds the circuit 162 generates an interrupt request to the priority encoder 127 and when an acknowledge signal is received it asserts the I/O address seventeen on the interrupt address bus 95a.

Figure 15B:
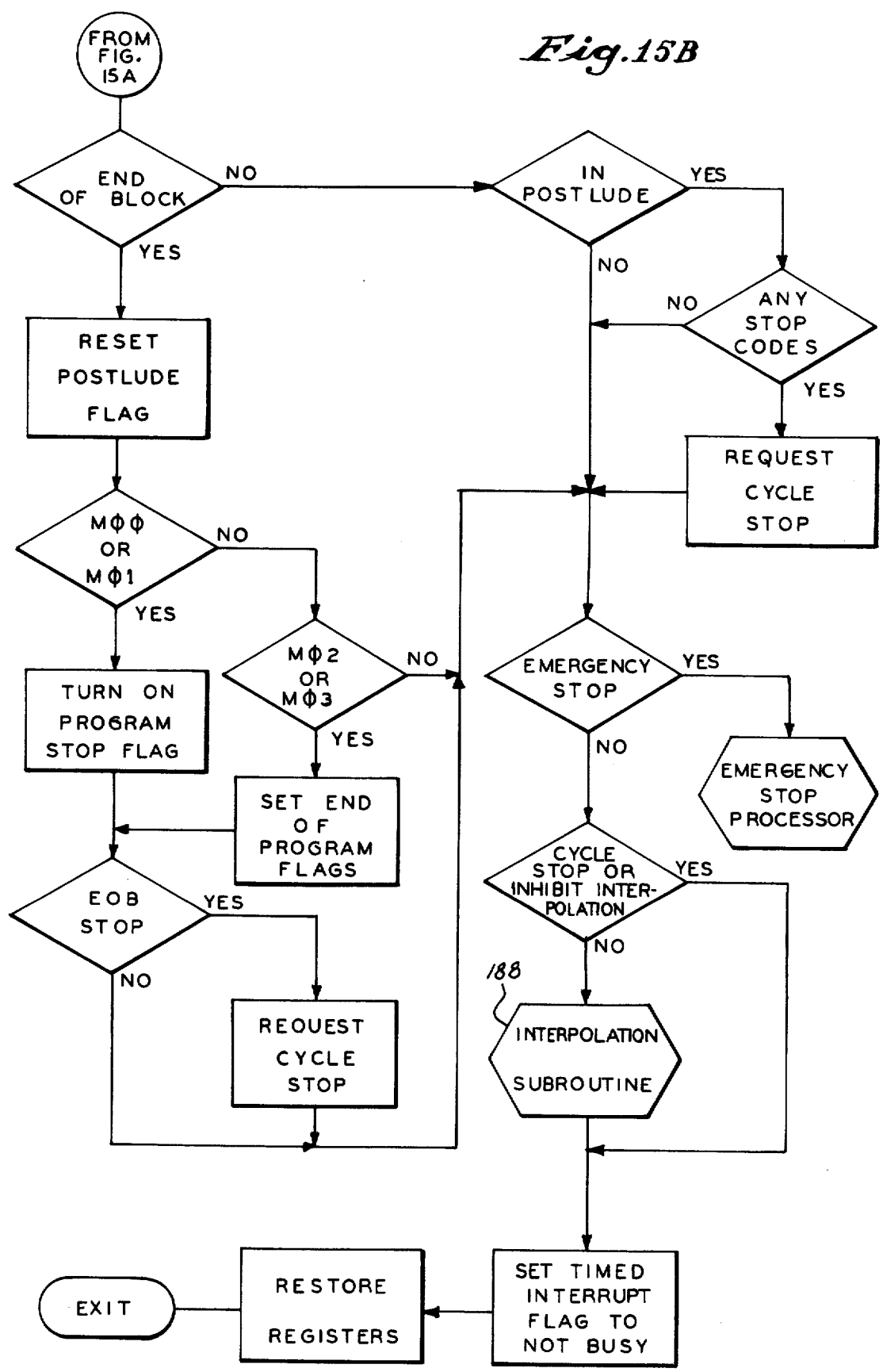

Circuits similar to the timed interrupt circuit 162 reside in the keyboards 7 and 8 and the tape reader 5. Each of these system I/O devices connect to the interrupt request line 160 and each is connected in "daisy chain" fashion to the interrupt acknowledge line 161. As shown in FIG. 6, the interrupt acknowledge line 161 is coupled through the interrupt circuit 162 by an AND gate 172 which is controlled by the $\overline{Q}$ output terminal on the R-S flip-flop 163. Thus, when the circuit 162 requests the interrupt, it not only responds to the resulting interrupt acknowledge signal, but it also prevents that signal from being coupled to subsequent system I/O devices in the daisy chain. In this manner, only one interrupting I/O device is serviced at a time. As will be described in more detail hereinafter, when an interrupt is acknowledged by the priority encoder circuit 127, it also initiates the execution of an interrupt sevice micro-routine which loads the I/O address of the interrupting device into register R4 of the memory 69. This I/O address is then employed to locate the starting address in the main read/write memory 34 of a macro-routine which services that particular system I/O device. For example, the timed interrupt circuit 162 calls up a ten millisecond timed interrupt routine (FIGS. 15a and 15b). The interrupt service micro-routine is listed hereinafter in the MICRO-ROUTINE APPENDIX.

It should be apparent from the description thus far that the various elements of the industrial control processor 13 are operated in sequence in response to micro-instructions which are read from the micro-program read-only memory 32 into the micro-instruction register 31 and which are then decoded by the decoder circuit 48. The address of the firt micro-instruction in any micro-routine to be executed is loaded into the micro-program sequencer 47 from one of the mapper proms 42-45 or 50 and as the micro-instructions are executed, the micro-program sequencer 47 is incremented one count to read out the next micro-instruction in the micro-routine until an EOX or EOXS code is detected which indicates the end of the micro-routine.

Referring particularly to FIG. 4b, to enable the use of JUMP micro-instructions, and to thus allow one level of micro-subroutine, a 12bit save register 120 is connected to the outputs of the micro-program sequencer 47 through a bus 121, and a 12-bit multiplexer 122 is connected to the inputs of the sequencer 47 through the address bus 46. The save register includes a clock lead 123 which connects to the micro-instruction decoder circuit 48, and when selected JUMP micro-instructions are executed, the address stored in the micro-program sequencer 47 is stored in the save register 120. The outputs of the save register 120 connect to a set of 12 A inputs on the multiplexer 122, and when a return call micro-instruction is subsequently executed, the address stored in the save register is coupled through the multiplexer 122 and loaded back into the micro-program sequencer 47. The multiplexer 122 also includes a set of B inputs which connect to the micro-instruction bus 31a, and when a JUMP micro-instruction is executed, the target address in the instruction is coupled from the micro-instruction register 31 to the micro-program sequencer 47 through the multiplexer 122. The multiplexer 122 is controlled by the data select lead 124 and an enable lead 125, both of which connect to the micro-instruction decoder circuit 48.

Referring to FIG. 4b, the micro-instruction bus 31a also couples to the processor data bus 30 through a set of sixteen AND gates 158. One input on each gate 158 connects to a lead in the bus 31a and a second input on each is commonly connected through a lead 159 to the micro-instruction decoder circuit 48. Their outputs connect to the respective leads in the processor data bus 30.

Referring particularly to FIG. 4a, the switches, lights and other control and indicating devices on the processor front panel 26 and the secondary control panel 12 are coupled to the processor data bus 30 by a control panel interface circuit 126. The control panel interface circuit 126 in turn is connected to inputs of a priority encoder 127 through a seventeen-lead bus 128 and five outputs on the priority encoder 127 connect to the priority mapper prom 50 through a bus 129. The control panel interface circuit 126 receives signals from panels 12 and 26 through the cables 15 and 27, and it receives signals through the processor data bus 30. In response, it generates a logic low on one or more of the leads in the cable 128 which determine the mode in which the industrial control processor 13 is to operate.

Referring particularly to FIG. 7, the priority encoder 127 includes a first three-bit binary encoder 130 which has a set of eight inputs, seven of which connect to the bus 128. The eighth input connects to the interrupt request line 160 from the I/O interface circuit 87. An eight-bit data latch 131 also has a set of eight inputs which connect to leads in the bus 128 and its eight output terminals connect to respective inputs on a second three-bit binary encoder circuit 132. Three output terminals 133 on the first binary encoder 130 connect to respective first inputs on three NAND gates 134-136. Similarly, three output terminals 137 on the second encoder 132 connect to respective second inputs on the NAND gates 134-136 and a fourth output terminal 138 on the second encoder 132 connects to an enable terminal 139 on the first binary encoder 130. The fourth output 138, the outputs of the respective NAND gates 134-136 and a seventeenth lead 140 in the bus 128 connect to respective leads in the bus 129 which in turn connects to the priority mapper prom 50. The lead 140 also connects to input number 4 on the first binary encoder 130.

The priority encoder 127 generates a five-bit binary code to the priority mapper prom 50 which is responsive to a logic low voltage at one of the seventeen leads in the bus 128, and which operates to address a line of the mapper prom 50. The mapper prom 50 is enabled when its EOX terminal 49 is driven to a logic high voltage at the completion of the micro-routine then being executed and a 12-bit starting address is read out of the addressed line of the enabled mapper prom 50 to the micro-program sequencer 47. Although more than one of the leads in the bus 128 may be low at any given time, the encoder circuit 127 generates the code, or mapper prom line address, only for that lead which has the highest priority. Listed from the lowest to highest priority, the signals on the respective lead numbers 0-16 in the bus 128 result in the following functions being performed:

| Lead No. | Micro-Routine | Description |
|---|---|---|
| 0 | FETCH | RUN mode in which the program stored in the main memory is executed. |
| 1 | INTERRUPT | A requested interrupt is serviced. |
| 2 | POWER UP/DOWN | A higher priority interrupt which is serviced before other interrupts. |
| 3 | START | Initiates the processor when it is switched from HALT to RUN mode. |
| 4 | HALT | Three-instruction micro-loop in which no execution of macro-instructions or servicing of interrupts will occur. |
| 5 | CLR DISPL | Display register on processor front panel 26 is cleared. |
| 6 | PAR NHLT | Interrupts and displays "memory error" on CRT. |
| 7 | PAR HLT | Interrupts and halts processor. |
| 8 | DISPL R | Display contents of a selected processor register on processor front panel 26. |
| 9 | DISPL T | Display contents of a selected memory location on processor front panel 26. |
| 10 | STORE R | Store contents of processor front panel display in selected processor register. |
| 11 | STORE T | Store contents of processor front panel display in selected memory location. |
| 12 | DECM | Decrement memory address register 36. |
| 13 | INCM | Increment memory address register 36. |
| 14 | STEP | Execute one macro-instruction, then halt. |
| 15 | BBL | A micro-program which transfers a permanently stored "bootstrap" macro-program to main memory and initiates its execution. |
| 16 | MPFF | Writes HALT codes in every location of the main memory when battery power is lost during an extended shutdown. |

The priority encoder 127 also includes a binary-to-octal decoder 165 which has a set of three inputs which connect to the respective NAND gates 134–136. The second of eight output terminals on the decoder 165 connects to the interrupt acknowledge line 161, and when the interrupt service micro-routine is requested by a logic high voltage on the interrupt request line 160, a logic high voltage is generated on the interrupt acknowledge line 161 when the request is granted.

Referring to FIGS. 4b and 8, a real-time clock circuit 145 is connected to the processor data bus 30 and is controlled by the micro-instruction decoder circuit 48. The real-time clock circuit 145 includes a D-type flip-flop 146 which has its clock terminal connected to receive a 5 mhz. clock signal through a lead 147 from the processor clock circuit 85. The D input on the flip-flop 146 is driven by a pair of NAND gates 148 and 149 through an AND gate 149a. A first input of the NAND gate 148 connects through a lead 150 to a 5 hz. clock signal output on the processor clock circuit 85 and a second input thereon connects through a lead 151 to the macro-instruction register 37. The lead 151 indicates the logic state of the least significant bit of the macro-instruction stored in the macro-instruction register 37 and it connects through an inverter gate 152 to a first input on the NAND gate 149. A second input on the NAND gate 149 connects to receive a 0.5 hz. clock signal from the processor clock circuit 85 through a lead 153. A Q output on the flip-flop 146 connects to one input on a NAND gate 154. A second input on the NAND gate 154 connects to the micro-instruction decoder circuit 48 through a TIM lead 155 and its output connects to the least significant digit lead in the processor data bus 30. In response to a selected micro-instruction (TIM), the state, high or low, of either the 5 hz. or 0.5 hz. clock may be applied to the least significant lead in the processor data bus 30 and examined.

The above described hardware is operated in response to micro-routines comprised of micro-instructions which are executed at a rate of one every 200 nanoseconds. These micro-instructions include codes which are decoded by the circuit 48 to generate enabling signals to the appropriate system elements. The operation of the hardware will become more apparent after the micro-instruction set which this hardware executes is discussed.

The micro-instruction set is comprised of three types of instructions. The first type of micro-instruction has the following format and is employed to transfer data between processor elements which couple to the processor data bus 30, to perform logical and arithmetic functions on data applied to the ALU 59, and to perform data test and micro-instruction skip operations.

| Bit No. | 23 22 21 20 19 | 18 17 16 15 14 | 13 12 11 10 9 | 8 7 6 5 4 | 3 2 1 0 |
|---|---|---|---|---|---|
| Description | PROCESSOR FUNCTION | ALU FUNCTION | DESTINATION FIELD | SOURCE FIELD | SKIP, FLAG and MAP |

The micro-instruction decoder circuit 48 simultaneously decodes each of the five "micro-orders" in this first type of micro-instruction and enables the appropriate processor elements to perform one or more functions. The processor element identified by the destination code is not enabled, however, until the last 50 nanosecond portion of the 200 nanosecond execution time period. The codes which may be employed in the five micro-orders of a type "type one" micro-instruction are as follows:

| PROCESSOR FUNCTION MICRO-ORDER CODES | | |
|---|---|---|
| Mnemonic | Bit Pattern | Description |
| ASG1 | 11010 | Enables decoding of alter/skip group 1 of macro-instruction. |
| ASG2 | 11011 | Enables decoding of alter/skip group 2 of macro-instruction. |
| CFLG | 01111 | Clear processor flag flip-flop 118. |
| COV | 01101 | Clear overflow flip-flop 116. |
| CYFL | 00111 | If processor flag flip-flop 118 is set, generate carry in to ALU 59. |
| DIV | 10000 | Divide 32-bit number in A and B registers by number in L register. |
| DMA | 01011 | Enables DMA cycle after execution of micro-instruction. |
| DWEL | 00100 | Causes 1 usec. freeze by disabling AND gate 86 on sequencer 47. |
| FLG | 11101 | Enables setting of processor flag bit. |
| FLGS | 11100 | Inverts condition of processor flag bit. |
| ICNT | 00010 | Increments the repeat counter 141 by one count. |
| IOFF | 00101 | Disables interrupt recognition except party errors and power fail interrupts. |
| IOG | 01010 | Initiates a 1 usec. I/O cycle. |
| L1 | 10100 | Performs a one-bit logical left shift on data leaving ALU. |
| L4 | 10111 | Performs a four-bit logical left shift on data leaving ALU. |
| MPY | 10001 | Multiplies number in A register by number in L register. |
| NOP | 00000 | No operation is performed. |

-continued

| Mnemonic | Bit Pattern | Description |
|---|---|---|
| R1 | or 11111 10101 | Performs a one-bit logical right shift on data leaving ALU. |
| READ | 01000 | Loads address into main memory address register 36 and reads out data or macro-instruction into memory data register 35. |
| RPT | 00011 | Repeats next micro-instruction and increments repeat counter 141. |
| RSS | 11110 | Reverses sense of SKIP/FLAG micro-order. |
| SFLG | 01110 | Sets the processor flag flip-flop 118. |
| SOV | 01100 | Sets overflow flip-flop 116. |
| SRG1 | 11000 | Arithmetic or rotational shift of data leaving ALU as determined by bits 6 through 9 in the macro-instruction register 37. |
| SRG2 | 11001 | Similar to above, but controlled by bits 0, 1, 2 and 4 in the macro-instruction register 37. |
| WRTE | 01001 | Loads address into main memory address register 36 and writes contents of memory data register 35 into main memory 34. |

ALU FUNCTION MICRO-ORDER CODES

| Mnemonic | Bit Pattern | Description |
|---|---|---|
| ADD | 00100 | Adds the data on processor data bus 30 to contents of L register 57. |
| ADDO | 00101 | Same as ADD, but extend and overflow logic enabled. |
| AND | 01100 | Performs a logical "and" of the data on the processor bus 30 and the contents of L register 57. |
| ARS | 11010 | Used in combination with shift processor function codes to perform arithmetic shift of combined contents of A register 67 and B register 68. |
| CMPS | 01010 | Ones complement data on processor data bus 30 |
| CRS | 11001 | Used in combination with shift processor function codes to perform circular rotate shift of contents of A register 67 and B register 68. |
| DEC | 00110 | Decrement data on processor data bus 30 by one count. |
| INC | 00010 | Increment data on processor data bus 30 by one count. |
| INCO | 00001 | Increment data on processor data bus 30 by one count with extend and overflow logic enabled. |
| IOR | 01110 | Logical "or" of the data on processor data bus 30 and contents of L register 57. |
| LGS | 11000 | Logical left shift of combined A register 67 and B register 68 when combined with processor shift codes. |
| LWF | 10011 | Combined with proper processor shift codes, it performs rotational shift of data applied to shifter 63 and the flag bit. |
| NAND | 01101 | Performs a logical "nand" on the data on processor data bus 30 and contents of L register 57. |
| NOR | 01111 | Performs a logical "nor" of the data on processor data bus 30 and contents of L register 57. |
| ONES | 01011 | Passes all "ones" to the shifter 63. |
| PASS | 00000 | Passes the data unchanged. |
| RSB | 10010 | Loads contents of save register 120 into micro-program sequencer 47. |
| SUB | 00111 | Subtracts contents of L register 57 from data on processor data bus 30. |
| SWD | 11111 | Switch on the processor control panel specifies the destination field. |
| SWS | 11110 | Switch on the processor control panel specifies the source field. |
| XNOR | 00011 | Performs logical exclusive "nor" of the data on the processor data bus 30 and the contents of L register 57. |
| XOR | 01000 | Performs logical exclusive "or" of the data on the processor data bus 30 and the contents of L register 57. |
| ZERO | 01001 | ALU passes all zeros. |

DESTINATION FIELD MICRO-ORDER CODES

| Mnemonic | Bit Pattern | Description |
|---|---|---|
| A | 10100 | Stores data on ALU bus 65 in A register 67. |
| ABT | 10110 | A register 67, B register 68 or memory 34 depending on contents of memory address register 36. |
| B | 10101 | Stores data on ALU bus 65 in B register 68. |
| CAB | 10001 | A register 67 or B register 68 depending on bit 11 in macro-instruction register 37. |
| CNTR | 11110 | Stores lower eight bits on processor data bus 30 in repeat counter 141. |
| DSPL | 11010 | Stores data on processor data bus 30 in processor front panel display. |
| IOO | 10111 | Couples data on processor data bus 30 to I/O data bus 91. |
| IR | 11011 | Stores data on processor data bus 30 in macro-instruction register 37. |
| IRIO | 11001 | Stores lower six bits on processor data bus 30 in I/O address register 93. |
| L | 10000 | Stores data on processor data bus 30 in L register 57. |
| M | 10011 | Stores data on processor data bus 30 in memory address register 36. |
| NOP | 11111 | No store operation. |
| P | 00000 | Store data on ALU bus 65 in the P register of memory 69. |
| T | 10010 | Store data on processor data bus 30 in the memory data register 35. |
| R1-R15 | 00001 through 01111 | Store data on ALU bus 65 in one of the respective registers R1 through R15 of the memory 69. |

SOURCE FIELD MICRO-ORDER CODES

| Mnemonic | Bit Pattern | Description |
|---|---|---|
| A | 10100 | Couples data from A register 67 to the processor data bus 30. |
| ABT | 10110 | A register 67, B register 68 or memory 34 depending on contents of memory address register 36. |
| ADDR | 11001 | Couples low portion of macro-instruction register 37 and high portion of memory address register 36 to the processor data bus 30. |
| B | 10101 | Couples data from B register 68 to the processor data bus 30. |
| CAB | 10001 | Couples data from A register 67 to the processor data bus 30 if bit 11 in macro-instruction register 37 is 0; couples data from B register 68 to the processor data bus 30 if bit 11 is a one. |
| CIR | 11000 | Couples six-bit address from I/O interrupt bus 95a to the processor data bus 30. |
| DSPL | 11010 | Couples contents of processor front panel display register (not shown) to the processor data bus 30. |
| IOI | 10111 | Couples data from the I/O data bus 91 to the processor data bus 30. |
| IR | 11011 | Couples data in macro-instruction register 37 to the processor data bus 30. |
| LDR | 11101 | Couples data from bootstrap loader prom to processor data bus 30. |
| M | 10011 | Couples data in memory address register 36 to the processor data bus 30. |
| MASK | 11100 | Enables bit pointer circuit 40. |
| NOP | 11111 | Processor data bus 30 contains all ones. |
| P | 0000 | Couples contents of P register in memory 69 to the processor data bus 30. |
| R1-R15 | 00001 through 01111 | Couples data from respective registers R1 through R15 in the memory 69 to the processor data bus 30. |
| T | 10010 | Couples main memory data from register 35 to the processor data bus 30. |
| TIM | 11110 | Couple output of real-time clock 145 to the processor data bus 30. |

SKIP MICRO-ORDER CODES

| Mnemonic | Bit Pattern | Description |
|---|---|---|
| ALO | 0010 | Skips the next micro-instruction if bit 0 at output of ALU 59 is a one. |
| AL15 | 0011 | Skips the next micro-instruction if bit 15 at output of ALU 59 is a one. |
| ALZ | 0001 | Skips the next micro-instruction if output of ALU 59 is zero. |
| CNT4 | 1001 | Skips the next micro-instruction if the four least significant bits of the repeat counter 141 are all ones. |

-continued

| Mnemonic | Bit Pattern | Description |
|---|---|---|
| CNT8 | 1000 | Skips the next micro-instruction if all the bits of the repeat counter 141 are ones. |
| COUT | 0100 | Skips the next micro-instruction if the ALU 59 produces a carry. |
| FLG | 1011 | Skips the next micro-instruction if the processor flag flip-flop 118 is set. |
| INTP | 1010 | Skips the next micro-instruction if an interrupt is pending. |
| NOP | 0000 | Do not skip next micro-instruction. |
| ONES | 0101 | Skips the next micro-instruction if the ALU 59 outputs are all ones. |
| OVFL | 0110 | Skips the next micro-instruction if the processor overflow flip-flop 116 is set. |
| UNCD | 0111 | Skips the next micro-instruction unconditionally. |

FLAG MICRO-ORDER CODES

| Mnemonic | Bit Pattern | Description |
|---|---|---|
| ALO | 0010 | Set the processor flag flip-flop 118 if the least significant bit output of ALU 59 is a one. |
| AL15 | 0011 | Set the processor flag flip-flop 118 if the most significant bit output of ALU 59 is a one. |
| ALZ | 0001 | Set the processor flag flip-flop 118 if the outputs of the ALU 59 are all zero. |
| COUT | 0100 | Set the processor flag flip-flop 118 if the ALU 59 produces a carry. |
| ONES | 0101 | Set the processor flag flip-flop 118 if outputs of ALU 59 are all ones. |
| OVFL | 0110 | Set the processor flag flip-flop 118 if an overflow occurs. |
| UNCD | 0111 | Set the processor flag flip-flop 118 unconditionally. |

The FLAG micro-orders are enabled only when the FLG or FLGS processor function micro-order appears in the same micro-instruction. Absent the FLG or FLGS micro-order, the SKIP micro-orders are enabled.

MAPPING MICRO-ORDER CODES

| Mnemonic | Bit Pattern | Description |
|---|---|---|
| EOX | 1100 | Indicates that micro-routine is complete after execution of next micro-instruction and enables priority mapper prom 50. |
| EOXS | 1101 | Indicates that micro-routine is complete and enables priority mapper prom 50. |
| MAP | 1111 | Enables macro-decoder circuit 38 to call up micro-routine specified by macro-instruction in register 37. |
| MAPI | 1110 | Enables macro-decoder circuit 38 to call up micro-routine after indirect addressing is resolved. |

The second type of micro-instruction has the following format:

| Bit No. | 23 22 21 20 19 | 18 17 16 15 14 | 13 12 11 10 9 | 8 | 6 5 4 3 2 1 0 |
|---|---|---|---|---|---|
| Description | PROCESSOR FUNCTION | ALU FUNCTION | DESTINATION | MODIFIER | OPERAND |

The processor function micro-order coders and the destination micro-order codes are the same as those for "type one" micro-instructions which are listed above. There are only two ALU function micro-order codes and in addition to the functions which these two codes specify as described below, they serve to identify the micro-instruction as one having the type two format.

ALU FUNCTION MICRO-ORDER CODES

| Mnemonic | Bit Pattern | Description |
|---|---|---|
| IMM | 10100 | Places sixteen bits onto the processor data bus 30 consisting of the 1's complement of the eight-bit binary OPERAND and another eight bits of all ones. The ALU 59 performs a PASS operation. |
| IMMC | 10101 | Same as IMM except the ALU 59 performs a 1's complement of the data on the processor data bus 30. |

MODIFIER MICRO-ORDER CODES

| Mnemonic | Bit Pattern | Description |
|---|---|---|
| HIGH | 1 | Specifies that the 1's complement of the OPERAND is applied to the eight most significant bit leads of the processor data bus 30. |
| LOW | 0 | Specifies that the 1's complement of the OPERAND is applied to the eight least significant bit leads of the processor data bus 30. |

The OPERAND micro-order code is an eight-bit binary integer which specifies a decimal number from 0 to 255 or an octal number from 0 to 377.

The third type of micro-instruction has the following format:

| Bit No. | 23 22 21 20 19 | 18 17 16 15 14 | 13 12 | 11 10 9 8 7 6 5 4 3 2 1 0 |
|---|---|---|---|---|
| DESCRIPTION | PROCESSOR FUNCTION | ALU FUNCTION | MODIFIER | OPERAND |

The processor function micro-order codes are the same as those for "type one" micro-instructions which are listed above. There are only two ALU function micro-order codes and in addition to the functions which these two codes specify as described below, they serve to identify the micro-instruction as one having the type three format.

ALU FUNCTION MICRO-ORDER CODES

| Mnemonic | Bit Pattern | Description |
|---|---|---|
| JMP | 10110 | Jump unconditionally to the micro-instruction address specified in the OPERAND. |
| JSB | 10111 | Jump unconditionally to the micro-instruction address specified in the OPERAND and store the return address in the save register 120. |

MODIFIER MICRO-ORDER CODES

| Mnemonic | Bit Pattern | Description |
|---|---|---|
| J30 | 01 | Replaces the four least significant bits of the OPERAND with the four least significant bits in the macro-instruction register 37. |
| J74 | 10 | Replaces the four least significant bits of the OPERAND with bits 4-7 in the macro-instruction register 37. |
| NOP | 11 | No modification of the OPERAND. |

The OPERAND micro-order code in a type three micro-instruction is a 12-bit address which is coupled through the multiplexer 122 to the micro-program sequencer 47.

The above-defined micro-instructions are combined to form micro-routines which are stored in the micro-program read-only memory 32. These micro routines are in turn employed to execute macro-instructions which are stored in the main memory 34. The macro-instructions are combined to form programs, or routines, which when executed, perform the various numerical control functions and operate the discrete digital devices associated with the machine tool. Before a more detailed description is made of the manner in which macro-instructions are executed by selected micro-routines, a general description of the software system of the industrial control processor 13 will be made in order to acquaint the reader with the objectives which are to be accomplished and the general manner in which the system operates to accomplish these objectives.

Also, for a description of some commercially available numerical control systems to which the present invention may be applied, reference is made to an article in the March, 1971 issue of *Control Engineering* by P. G. Mesniaeff entitled "The Technical Ins and Outs of Computerized Numerical Control."

The operation of the industrial control processor 13 is determined by the software routines stored in its main memory 34 which together form the software system. The software system is comprised of four main categories: background routines; ten-millisecond timed interrupt control routine; tape reader service routine; and keyboard service routine.

Figure 9:
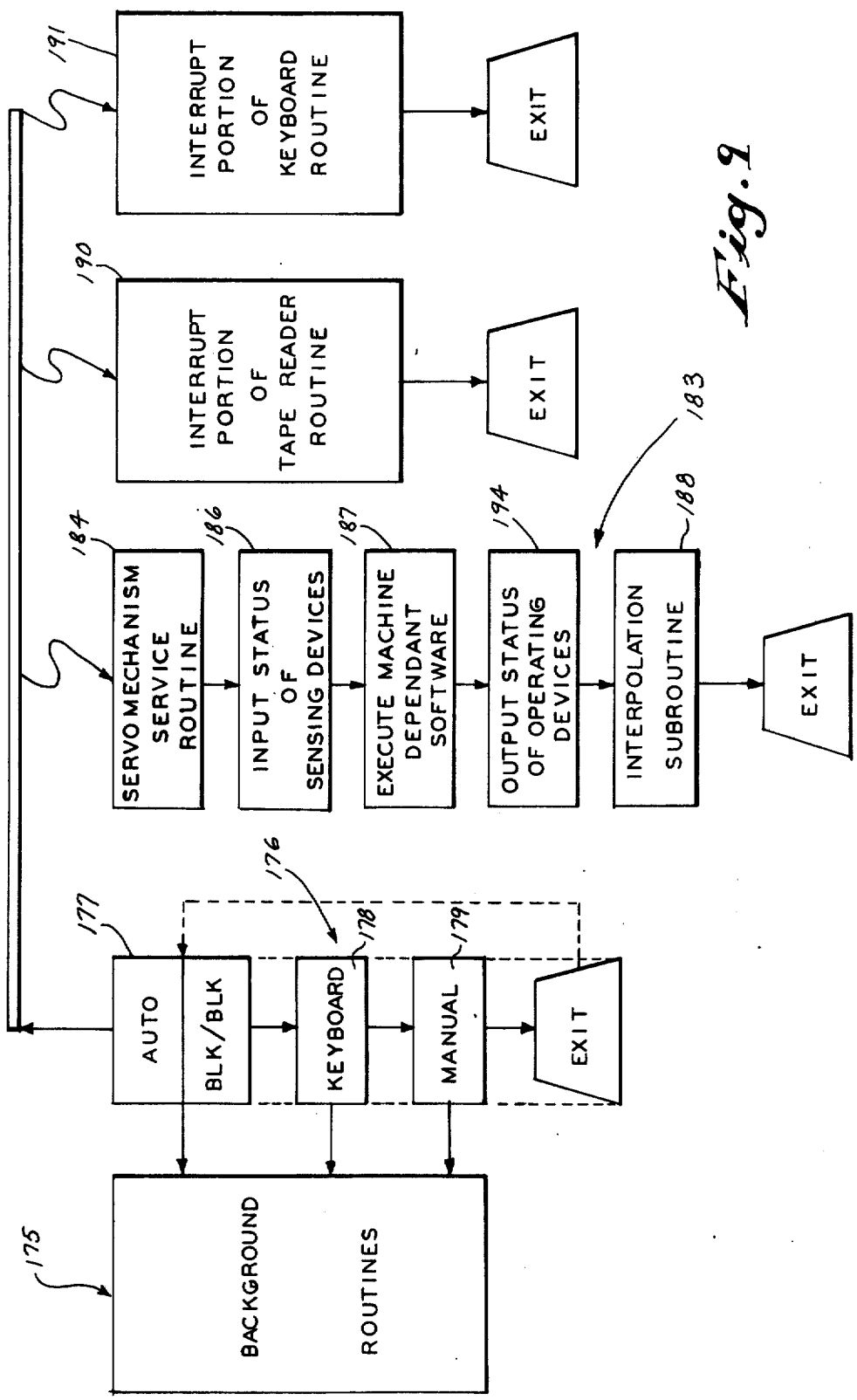
FIG. 9 is a flow chart of the software system.

Referring to FIG. 9, the background routines 175 consist of such basic numerical control routines as setup, decode, noninterrupt portion of the keyboard and tape reader routines, display update subroutine, ASCII-to-octal and octal-to-ASCII converters, math and support routines, jog, keyboard servicing, tool and fixture offset, cutter compensation, and part program editing. The background routines also include those associated with the programmable controller aspects of the system, such as machine dependent software loader and editor, hardcopy output, punch output and I/O monitor. Most of these background routines are selectively called up by a main control, or executive, routine 176 which is comprised of three program loops 177-179. The three loops 177-179 are selected by the mode switches on the main control panel 10; the first loop 117 responding to the selection of the automatic or block-by-block modes; the second loop 178 responding to the keyboard mode; and the third loop 179 responding to the manual mode. A detailed flow chart of the main control routine 176 is shown in FIG. 13.

The automatic and block-by-block modes of operation are performed by a common loop 177 which calls up selected background routines 175. These routines initialize the tape reader 5, read in the block of part program data, decode it and set it up. The routine 177 then calls up a block execute routine which performs the actual execution of the block of part program data.

Figure 14B:
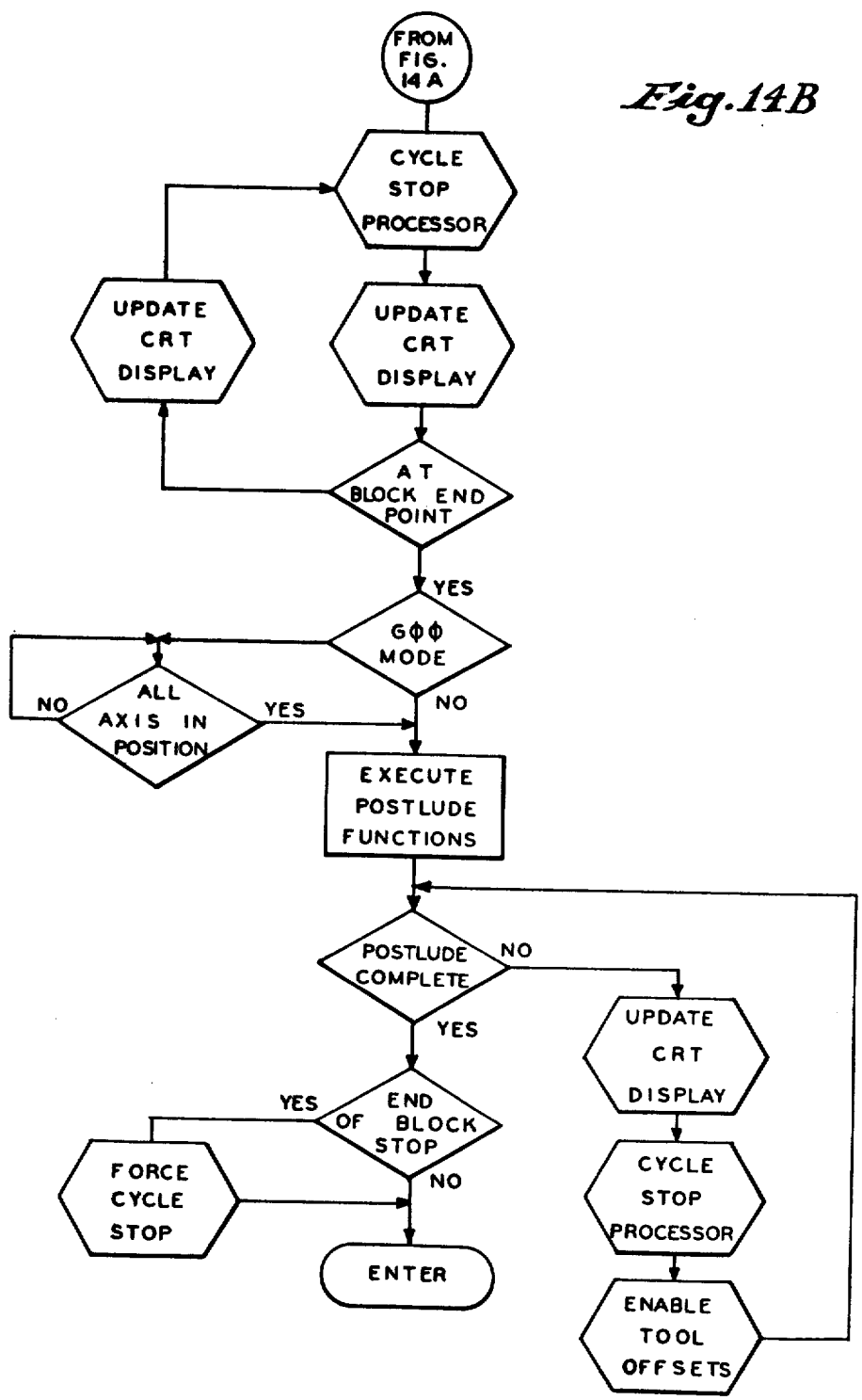
Figure 14A:
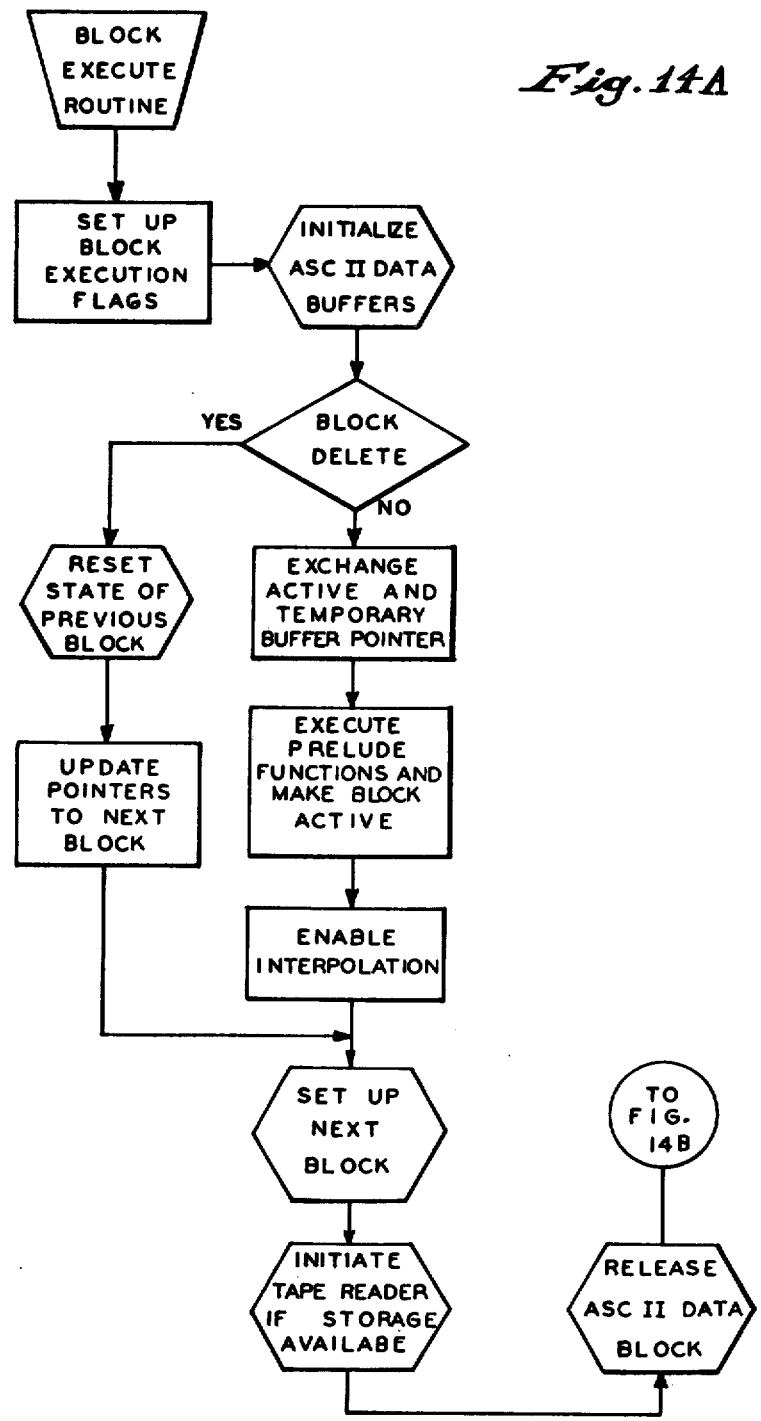

As shown in the detailed flow chart of FIGS. 14a and 14b, the block execute routine is divided into a preblock, or prelude, portion, an interpolation portion and a postblock, or postlude, portion. During the prelude portion selected system flags are set to indicate that certain functions such as turn on spindle, coolants, etc., are to be performed. These flags are stored in selected memory locations in a system flag table 182 in the main memory 34. Similarly, during the postlude portion of the block execute routine flags are set in the table 182 to indicate that certain functions such as tool changes, shuttles, turning off coolants and spindle, etc., are to be performed by the machine dependent discrete devices. As will become more apparent from the description which follows, it is the flag table 182 which interfaces the numerical control functions of the system with the programmable controller functions of the system.

The second loop 178 of the main control routine 176 is entered when the keyboard enable pushbutton on the main control panel 10 is pushed. This mode is employed, for example, to perform such functions as part program editing of the machine dependent software routine which will be described in detail hereinafter with reference to the flow charts of FIGS. 17-20. The third loop 179 of the main control routine 176 is entered when the front panel selector switch is set to manual. The manual routine contains all of the operator functions such as jog, tape controls, and set zero which are each performed by respective routines that are selectively called up. The main control routine 176 thus manages all of the background functions of the system which serve to prepare the industrial control processor 13 to provide data to the servo mechanisms on the machine tool and to indicate to the associated discrete digital devices the auxiliary functions that are to be performed.

The remaining portions of the software system interrupt the main control routine 176 to service the I/O interface racks 20 and 21 and the system I/O devices. A 10 millisecond timed interrupt routine 183 performs the actual transfer of data from the industrial control processor 13 to the machine servo mechanisms and the discrete digital devices on the controlled machine. This routine is indicated generally in FIG. 9 and it is executed to the finish every 10.24 milliseconds following an interrupt posted by the timed interrupt circuit 162. As indicated above, an interrupt service micro-routine loads the starting memory address of the 10 millisecond timed interrupt routine 183 in the P register (program counter) of the memory 69 and it is then executed to the finish.

Referring to FIG. 9 and the detailed flow chart of the ten millisecond timed interrupt routine in FIGS. 15a and 15b, after various housekeeping functions are preformed, position feedback data and position command data is coupled between the I/O interface rack 20 and the industrial control processor 13 by a servo mechanism service routine 184. For a three-axis machine, for example, the x, y and z axis position feedback accumulators are connected to slots 0-2 of the first I/O interface rack 20 and servo mechanism command registers are connected to slots 3-5. The routine 184 sequentially couples the three 16-bit feedback words to corresponding lines in the read/write memory 34 and the three 16-bit command words previously calculated and stored at three memory locations in the main memory 34 are coupled to slots 3-5 of I/O interface rack 20.

The status of all sensing devices connected to the I/O interface racks 20 and 21 are then coupled to the main memory 34 by an input status routine 186. The routine 186 sequentially couples the 16 bits of status data from slots in the I/O interface racks 20 and 21 to an associated line in the main memory 34. A portion of the main memory 34, hereinafter called the I/O image table 185, is dedicated to storing this status data as well as the data which is to be outputted to the I/O interface racks 20 and 21. A more detailed description of the association between the I/O slots in the interface racks 20 and 21 and the lines in the I/O image table 185 is provided hereinafter and the INPUT SCAN micro-routine which couples data from eight slots in an I/O interface rack with the I/O image table 185 is provided in the MICRO-ROUTINE APPENDIX.

A machine dependent software routine 187 is executed next to determine the state to which all operating devices connected to the I/O interface racks 20 and 21 are to be driven. As will be described in detail hereinafter, the machine dependent software routine 187 is comprised of programmable controller instructions which are executed in sequence to solve Boolean expressions and thereby determine the state of operating devices. In making these determinations the status of selected bits in the I/O image table 185 and the system flag table 182 are examined to ascertain a picture of the current state of both the numerical control system process and the machine dependent devices connected to the system. The determined states are stored in the I/O image table 185, and after the routine 187 is executed, these states are coupled to the output circuits in the I/O interface racks which drive the associated operating devices by an output status routine 194. The routine 194 couples sixteen-bit status words from the main memory 34 to their associated I/O interface rack and slot. The OUTPUT SCAN micro-routine for coupling I/O image table status words to the eight slots in an I/O interface rack is provided in the MICOR-ROUTINE APPENDIX.

If a block of part program data has been set up and the prelude functions completed, an interpolation subroutine 188 is executed to calculate position command data for the machine servo mechanisms. These calculated position command words control the servo mechanisms for a 10.24 millisecond time period and are outputted by the servo mechanism service routine 184 during the subsequent ten-millisecond interrupt. The timed interrupt routine 183 is exited back to the main control routine 176.

It should be apparent from the description thus far that the machine dependent software program is executed once during each 10.24 millisecond interrupt to examine the status of the sensing devices as they appear in the I/O image table 185 during that 10-millisecond interval and to set the status of the bits in the I/O image table 185 which correspond to operating devices. Just as often, the I/O image table 185 is updated by coupled data between it and the interface racks 20 and 21 to insure that its state is an accurate image of the state of the machine being controlled.

Referring again to FIG. 9, a third category of routines which comprise the software system is the tape reader routine which is divided into two portions; the interrupt portion 190 and the background portion. The tape reader routine is called by the main controller routine 176 which employs the background portion of the tape reader routine to perform the initialization functions. After initialization by the background portion, a tape reader interrupt will then occur whenever a new tape character is positioned under the read head of the tape reader 5 and the interrupt portion of the tape reader routine 190 is executed. This routine reads the tape character and stores it in a selected data buffer in the main memory 34. It also sets flags in the system table 182 when the end of block character is read or when the block limit is exceeded.

A fourth category of routines which comprise the software system is the keyboard and CRT routine. This includes an interrupt portion 191 which is entered each time a key is depressed on the MDI keyboard 8 or the auxiliary keyboard 7. Background portions of the keyboard and CRT routine interpret the received ASCII characters as data which is stored in the main memory 34 or as codes which call for the execution of specific subroutines. The two keyboards 7 and 8 are connected in parallel and the only difference between the two is the symbols imprinted on their keys. The MDI keyboard 8 includes keys having symbols typical of those found on numerical control systems and the auxiliary keyboard 7 includes keys having symbols typical of those found on program loaders for programmable controllers. For example, a set of keys on the auxiliary keyboard 7 contain symbols of elements found in ladder diagrams and as these keys are depressed, a ladder diagram is constructed on the CRT display 9. In this manner, controller instructions to be loaded into the machine dependent software portion 187 of the main memory 34 are generated at the auxiliary keyboard 7, and a ladder diagram corresponding to the control program being developed is simultaneously constructed on the CRT display 9. Other keys on the auxiliary keyboard 7 call for editing functions to be performed on the control program being developed. These include SEARCH, MONITOR, GAP and UNGAP functions as described in the above cited U.S. Pat. No. 3,813,649.

Figure 16:
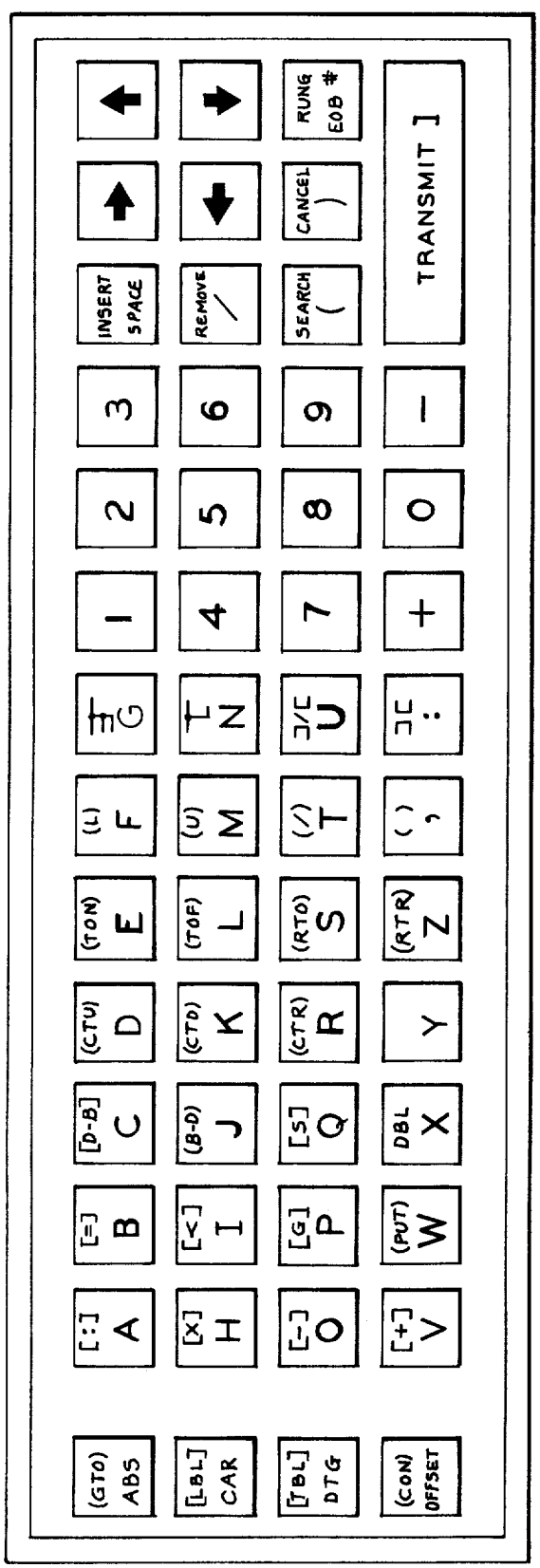
FIG. 16 is an illustration of a single keyboard which may be substituted for the two keyboards illustrated in FIG. 1, FIGS. 17 and 18 are flow charts of the program editor routine which forms part of the system software in FIG. 9, FIGS. 19a-c are flow charts of subroutines called up by the program editor routine of FIG. 18, and FIGS. 20a and b is a flow chart of an XIC key subroutine called up by the program editor routine of FIG. 18.
Figure 17:
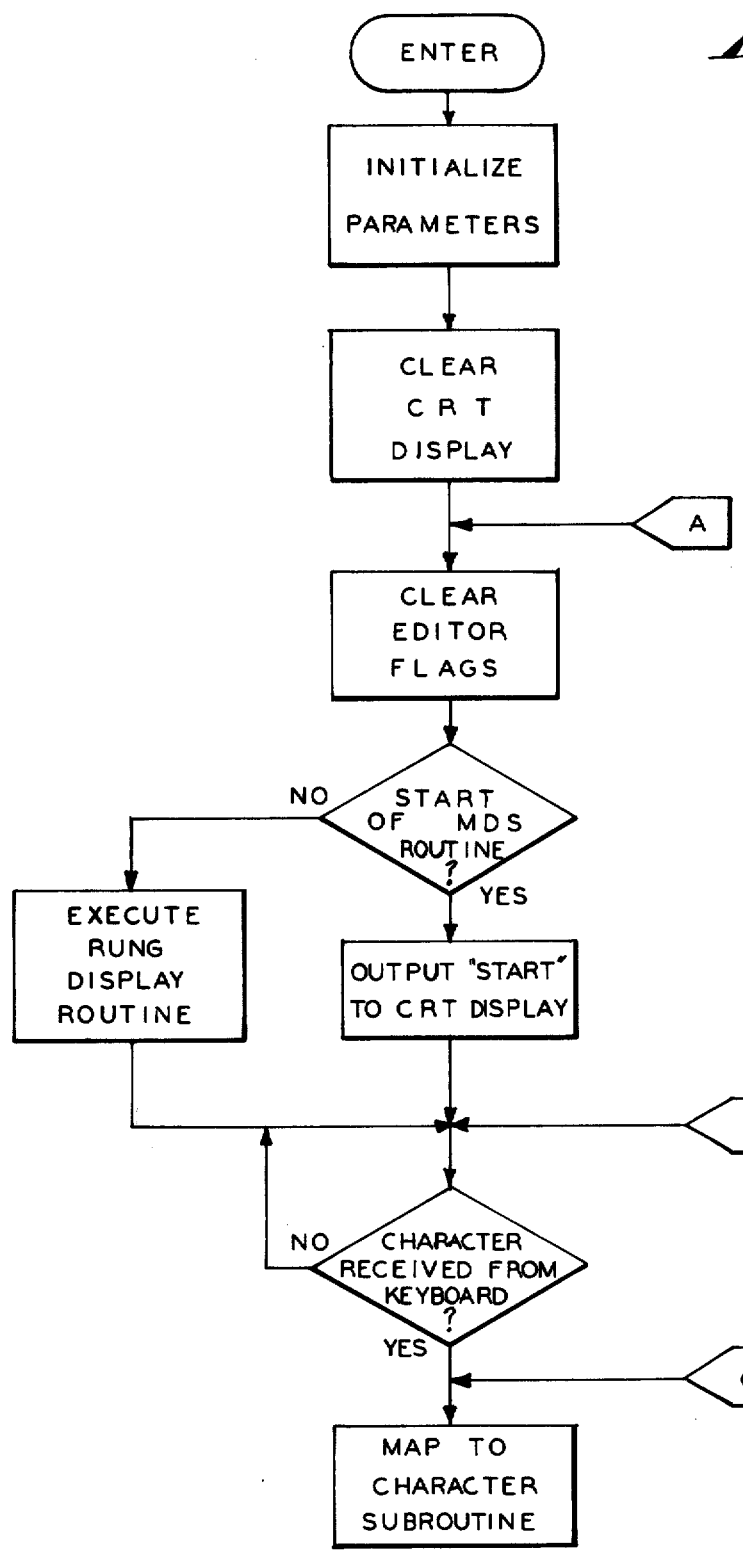

It should be apparent to those skilled in the art that a single keyboard may be employed to serve both the numerical control and programmable controller functions. In such case it is convenient to mark the keys with the symbols associated with both their functions as shown in FIG. 16. Whether one keyboard or two keyboards are employed, control resides in the MDI keyboard 8 when the system is placed in the keyboard mode. By entering the command "AL, PE" through the MDI keyboard 8, however, a program editor background routine is called up and all subsequent ASCII characters are interpreted according to the programmable controller symbols on the keyboard keys. A flow chart of the program editor routine is illustrated in FIG. 17 and is described in more detail hereinafter.

As indicated above, an image, or picture, of the state of the machine being controlled by the industrial control processor 13 is stored in the I/O image table 185 of the main memory 34 and the state of the numerical control aspects of the system is stored in the system flag table 182. Referring to FIG. 10, the I/O image table 185 is comprised of up to 24 lines of the main memory 34, not all of which are used in the preferred embodiment described herein. Slots 6 and 7 of interface rack 20 are coupled to corresponding lines 6 and 7 of the I/O image table 185 and all eight slots in the I/O interface rack 21 are coupled to corresponding lines 20–27 (octal) in the I/O image table 185. Each of these slots in the interface racks 20 and 21 that connect to the I/O image table 185 include 16 separate input or output circuits which each connect to a discrete digital device on the machine tool 3 such as a limit switch or a motor starter. Each of these input or output circuits is associated with one of the 16 bits on a memory line in the I/O image table 185, and thus, there exists a status bit in the I/O image table 185 which is associated with each discrete digital device connected to the I/O interface racks 20 and 21. For example, a switch S mounted on the machine tool 3 closes when the maximum X-axis slide motion has been reached and it is connected to an input circuit mounted in slot 3 of interface rack 21. Bit 14 in memory line 023 (octal) corresponds to this limit switch S and when the limit switch S closes, this bit is set to a one state during the next 10.24 millisecond timed interrupt. The status of bit 14 in line 023 can then be examined by an instruction in the machine dependent software routine 187 to ascertain the status of its corresponding sensing device.

The machine dependent software routine 187 is comprised of controller instructions which examine the status of selected bits in the I/O image table 185 and controller instructions which set the status of selected bits in the table 185. The examination type controller instruction is comprised of two memory words, the first word indicating the operation code and a four-bit binary bit pointer, and the second word indicating the memory address of the status bit. To test whether the limit switch S in the above illustration is closed, for example, the following two-word examination type macro-instruction would be executed by the industrial control processor 13:

WORD ONE: XIC,14 1 000 101 001 11 1110
WORD TWO: 00023 0 000 000 010 011

As will be described in more detail below, the XIC operation code points to a selected micro-routine, which when executed, reads the contents of I/O image table line 023 (octal) onto the processor data bus 30. The bit pointer circuit 40 is enabled and the four-bit pointer (1110) is applied thereto to mask out all but status bit 14. The logic state of bit 14 is thus coupled to the ALU 59 where it is tested.

The system operates similarly to set the status of selected status bits in the I/O image table 185. For example, a solenoid (SOL) which connects to an output circuit number 12 in slot 2 of the third I/O interface rack 21 is to be controlled by the machine dependent software routine 187. In this example the status bit number 12 on I/O image table line 022 (octal) corresponds to the solenoid SOL and the state of the solenoid SOL can be controlled by setting this status bit to the appropriate state. The macro-instruction which sets the solenoid status bit on I/O image table line 022 (octal) to a logic one state is as follows:

WORD ONE OTE,12 1 000 101 011 00 1100
WORD TWO 00022 0 000 000 010 010

The first word is the operation code which selects the appropriate micro-routine and prepares the bit pointer circuit 40 and the second word selects the memory line. Once set by the controller instruction, the state of the status bit is coupled to the output circuit which drives the solenoid SOL by the data output routine 189. It should be noted that the I/O image table 185 may be located anywhere in the main memory 34. As a consequence, the second word in each controller instruction will typically contain a number much larger than those contained in the above examples, which number identifies the absolute memory address of the desired status bit.

As indicated above, the system flag table 182 serves to interface the programmable controller aspects of the system with the numerical control aspects of the system. As illustrated in FIG. 10, the flag table 182 is stored adjacent the I/O image table 185 at relative memory lines 200-377 (octal). The contents of the system flag table for a three-axis milling machine is listed in the System Flag Table Appendix of this description. Note that considerable space is vacant so that the system can be configured by the user to the particular type and model of machine tool employed. The state of the flag table 182 is primarily determined by the background routines 175 which are called up by the main control routine 176, although the machine dependent software routine 187 does control some of them. The machine dependent software routine 187 may examine the status of any system flag during its execution with an XIC instruction as described above, or other examination type programmable controller instructions which will be described further hereinafter. In short, the system flag table 182 is treated essentially as an extension of I/O image table 185 which provides a picture, or image, of the state of the industrial control system as it executes a part program. The system flag table 182 serves to coordinate the operation of the machine dependent operating devices with the execution of the part program.

The machine dependent software program 187 stored in the main memory 34 is comprised of sets of programmable controller type macro-instructions which are executed sequentially once during each 10.24 millisecond timed interrupt. As with conventional programmable controllers, these macro-instructions execute Boolean equations to determine whether a particular operating device should be energized or deenergized. As disclosed in U.S. Pat. No. 3,942,158 entitled "Programmable Logic Controller," which is assigned to the Allen-Bradley Company, assignee of the present invention, the programmable controller instructions include those which examine and test the status of selected status bits in the I/O image table 185 and ones which set selected status bits therein to a logic state determined by the outcome of a Boolean equation. The industrial control processor of the present invention will directly execute a full set of programmable controller type instructions, thus enabling the user to develop the machine dependent software program 187 using conventional programmable controller instructions and programming techniques such as those described in U.S. Pat. No. 3,813,649 entitled "Controller Program Editor."

The programmable controller macro-instruction set includes thirty-three operating instructions and nine editing instructions. The operating instructions may be divided into the five following categories: basic, timer; counter; arithmetic and special. The basic instructions are those required to execute, or solve, Boolean equations. In the following list of such instructions the "display and keyboard symbol" which is indicated for each, appears on a key of the auxiliary keyboard 7 and it appears on the screen of the CRT display 9 when that key is depressed.

| Mnemonic | Display and Keyboard Symbol | Basic Instructions Operation Code (Octal) | Description |
|---|---|---|---|
| XIC | -] [- | 10516 | Examine status bit closed or, is the status bit in a logic 1 state? |
| XIO | -]/[- | 10520 | Examine status bit open or, is the status bit in a logic 0 state? |

-continued

| Mnemonic | Display and Keyboard Symbol | Operation Code (Octal) | Description |
|---|---|---|---|
| BND | ⊐⊏ | 10524 | Branch end; termination of a Boolean subbranch. |
| BST | ⊐⊏ | 10522 | Branch start; opens, or begins a Boolean subbranch. |
| OTE | -( )- | 10530 | If conditions are true turn status bit on and if conditions are false turn status bit off. |
| OTD | -(/)- | 10526 | If conditions are true turn status bit off and if conditions are false turn status bit on. |
| OTL | -(L)- | 10554 | If conditions are true turn status bit on and if false, do nothing. |
| OTU | -(U)- | 10534 | If conditions are true turn status bit off and if false, do nothing. |
| GET | -[G]- | 10532 | Get word stored on the selected memory line and store in A register 67. |
| EQL | -[=]- | 10540 | Is the value stored in A register 67 equal to the value stored on the selected memory line? |
| LES | -[<]- | 10542 | Is the value stored in A register 67 less than the value stored on the selected memory line? |
| PUT | -(PUT)- | 10544 | If conditions are true write the word stored in A register 67 into the selected memory line; if false, do nothing. |

TIMER INSTRUCTIONS

| Mnemonic | Display and Keyboard Symbol | Operation Code (Octal) | Description |
|---|---|---|---|
| TON 0.1 | -(TON)- | 105143 | If conditions are true wait until time is out then turn output on, otherwise, turn output off. |
| TON 1.0 | -(TON)- | 105144 | Same as TON 0.1 except longer timing interval possible. |
| TOF 0.1 | -(TOF)- | 105145 | If conditions are true turn output on, otherwise, wait until time is out then turn output off. |
| TOF 1.0 | -(TOF)- | 105146 | Same as TOF 0.1 except longer timing interval possible. |
| RTO 0.1 | -(RTO)- | 105147 | If conditions are true wait until time is out then turn output on, otherwise, stop timer. |
| RTO 1.0 | -(RTO)- | 105150 | Same as RTO 0.1 except longer timing interval possible. |
| RTR | -(RTR)- | 105151 | If the conditions are true reset the timer. |

COUNTER INSTRUCTIONS

| Mnemonic | Display and Keyboard Symbol | Operation Code (Octal) | Description |
|---|---|---|---|
| CTU | -(CTU)- | 105140 | If conditions are true increase the count by one. |
| CTD | -(CTD)- | 105141 | If conditions are true decrease the count by one. |
| CTR | -(CTR)- | 105142 | If conditions are true reset the counter to zero. |

ARITHMETIC INSTRUCTIONS

| Mnemonic | Display and Keyboard Symbol | Operation Code (Octal) | Description |
|---|---|---|---|
| PLUS | -[+]- | 105500 | Add contents of A register 67 with data from addressed line of memory 34 and store result in A register 67. |
| MINUS | -[−]- | 105520 | Subtract data on addressed line of memory 34 from contents of A register 67 and store result in A register 67. |

SPECIAL INSTRUCTIONS

| Mnemonic | Display and Keyboard Symbol | Operation Code (Octal) | Description |
|---|---|---|---|
| TBL | -[TBL]- | 105153 | Read a line from user data table into the A register 67. |
| B/D | -[B-D]- | 105154 | Binary to decimal conversion. |
| D/B | -[D-B]- | 105155 | Decimal to binary conversion. |
| SLR | -[S>]- | 10146 | Shift contents of A register 67 right a specified amount. |
| SLL | -[S<]- | 10546 | Shift contents of A register 67 left a specified amount. |
| OUTP | | 105157 | Couple contents of I/O image table 185 to one I/O interface rack. |
| INPT | | 105156 | Couple data from one I/O interface rack to associated memory locations in I/O image table 185. |

The editing instructions are employed to develop the machine dependent software using the keyboard 7 and the CRT display 9. These instructions call up subroutines which execute functions defined as follows:

| Mnemoic | Keyboard Symbol | Operation Code (Octal) | Description |
|---|---|---|---|
| | INSERT | | An opening is formed in the machine dependent software for the insertion of an additional PC type macro-instruction. |
| | REMOVE | | A PC type macro-instruction is removed from the machine dependent software routine and the resulting gap is closed. |
| | RUNG | | Specifies the ladder diagram rung be displayed on CRT 9 and edited with keyboard 7. |
| | ↑ | | Decrements rung cursor to display and edit previous rung. |
| | ↓ | | Increments rung cursor to display and edit next rung. |
| | → | | Moves element cursor to the right to load or edit next rung element. |
| | ← | | Moves element cursor to the left to edit previous rung element. |
| | CANCEL | | Cancels searches and numeric input. |
| | SEARCH | | Displays on CRT screen a selected PC type macro-instruction in the machine dependent software routine. |

Figure 12A:
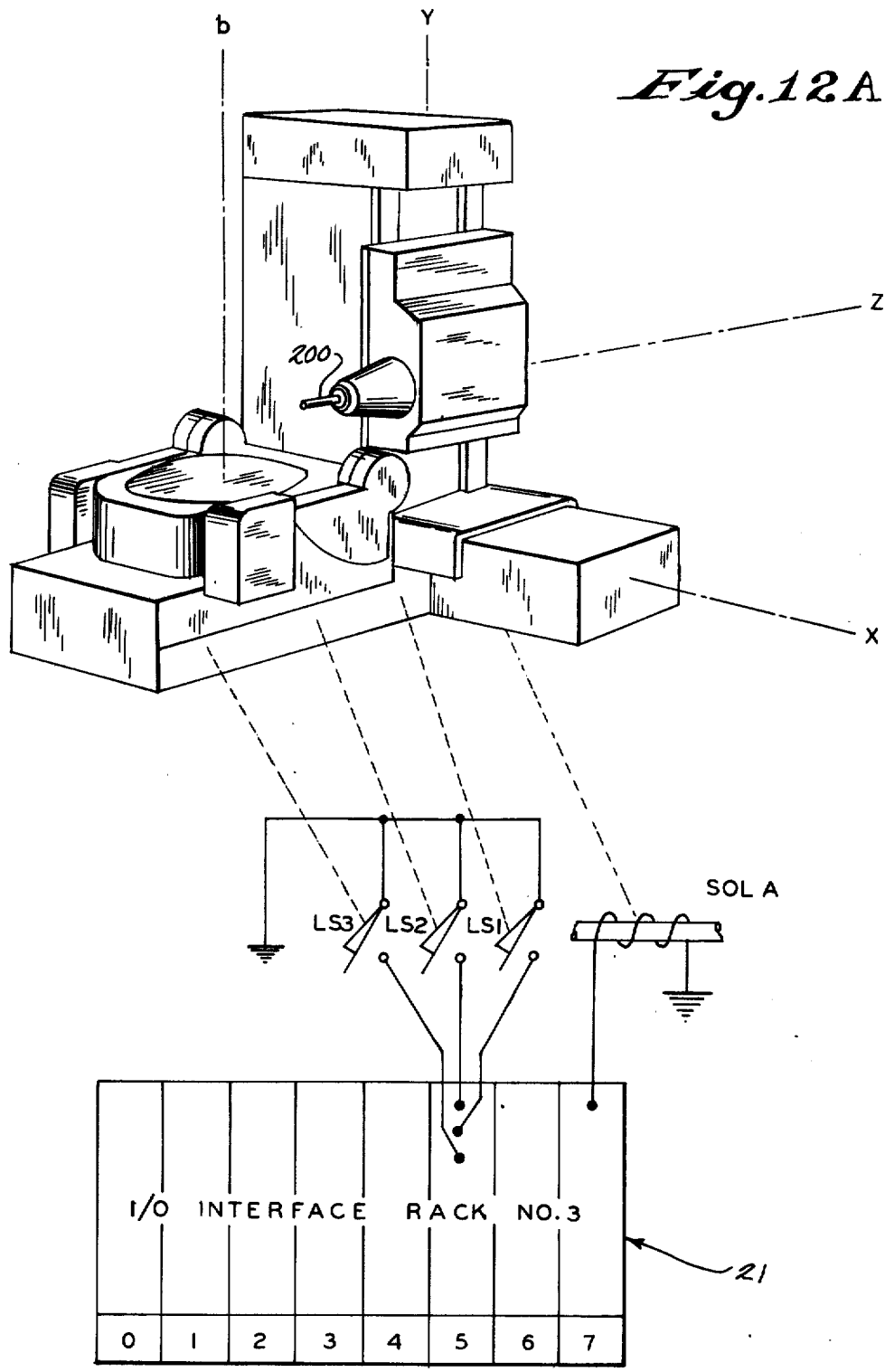
FIG. 12a is a schematic drawing employed to illustrate the programming of the processor of FIG. 4a, FIG. 12b is a ladder diagram employed to illustrate the programming of the processor of FIG. 4a, FIG. 13 is a flow chart of the main controller routine whic forms part of the software system of FIG. 9, FIGS. 14a and 14b are a flow chart of the block execute routine which forms part of the software system of FIG. 9, FIGS. 15a and 15b are a flow chart of the 10 millisecond timed interrupt routine which forms part of the software system of FIG. 9.

An example program will now be described in order to gather an appreciation of what functions are to be performed. The example program applies to a three-axis (x, y and z) machine tool illustrated schematically in FIG. 12a in which a cutting tool 200 is moved along each axis in response to position command words read from a part program tape on the system tape reader 5. The machine tool includes an index table 201 which supports the part and is rotatable about a vertical b-axis to orient the part with respect to the cutting tool 200. The motor used to provide X-axis motion is employed to rotate the index table 201. The index table 201 is unclamped, raised, and a mechanical transfer of power to the index table gear train occurs when a solenoid (SOL A) is energized. A first limit switch (LS1) detects when the index table reaches the UP position, a second limit switch (LS2) detects when the gear train is meshed and a third limit switch (LS3) detects when the index table is in the down position. The desired sequence of operation is as follows:

1. A b word command to rotate index table 201 is read from the tape reader 5 and becomes stored in active buffer of main memory 34. Latch prelude and postlude request flags in system flag table 182.
2. When all axes are in position and the control system is in prelude, start to unclamp the index table and move it to up position by energizing SOL A.
3. Insure index table is in up position by checking LS1 and that the gear train is meshed by checking LS2.
4. Release prelude. The control system will then execute the b command word to rotate the index table 201.
5. Allow one-second time delay after b axis is in position to allow for overshoot resolution.
6. Wait for postlude, then de-energize SOL A.

7. Check the gear mesh (LS2), insure index table 201 is in down position (LS3) and then release postlude.

The assignment of terminals on the I/O interface racks 20 and 21 for the external I/O devices (LS1, LS2, LS3 and SOL A) is arbitrary. They have been connected as shown in FIG. 11 to the first three terminals in slot 5 and the first terminal of slot 7 of the third I/O interface rack 21. The following table summarizes these assignments.

| I/O DEVICE | STATE | DESCRIPTION | STATUS BIT MEMORY ADDRESS |
|---|---|---|---|
| LS1 | TRUE (1) | Index table up. | 025 00 |
|  | FALSE (0) | Index table down. |  |
| LS2 | TRUE (1) | Gears meshed. | 025 01 |
|  | FALSE (0) | Gears not meshed. |  |
| LS3 | TRUE (1) | Index table down. | 025 02 |
|  | FALSE (0) | Index table not down. |  |
| SOL A | TRUE (1) | Unclamp and move index table up and change x axis drive to b axis. | 027 00 |
|  | FALSE (0) | Move index table down and clamp it and change drive back to x axis. |  |

The internal system flags necessary to coordinate this sequence of events with the execution of the part program tape are as follows:

| FLAG | STATE | DESCRIPTION | FLAG TABLE MEMORY ADDRESS |
|---|---|---|---|
| $SPST | TRUE (1) | Hold system in postlude. | 250 17 |
|  | FALSE (0) | No postlude hold request |  |
| $XFER | TRUE (1) | Part program data block initialized. | 264 17 |
|  | FALSE (0) | Date book not initialized. |  |
| $PSTX | TRUE (1) | Postlude active. | 266 17 |
|  | FALSE (0) | Postlude not active |  |
| $INPO | TRUE (1) | All axes in commanded position. | 271 17 |
|  | FALSE (0) | All axes not in position |  |
| !CUR2 | TRUE (1) | B axis command in data block. | 340 03 |
|  | FALSE (0) | No B axis command. |  |
| $SPRE | TRUE (1) | Hold system in prelude. | 251 17 |
|  | FALSE (0) | No prelude hold request. |  |
| $PREX | TRUE (1) | Prelude active | 267 17 |
|  | FALSE (0) | Prelude not active. |  |

A program for executing the above described sequence of events is entered into the machine dependent software section 187 of the main memory 34 by sequentially depressing the appropriate keys on the auxiliary keyboard 7. As each key is depressed, the character is displayed on the CRT display 9 in ladder diagram format as illustrated in FIG. 12b. The resulting is as follows:

| Rung No. | Instruction | Description |
|---|---|---|
| 1 | XIC 34003 | If a b axis command is present in a block of part program data, |
|  | XIC 26417 | and if that block of data has been initialized, |
|  | OTL 25017 | then latch postlude hold bit. |
| 2 | XIC 25017 | If postlude hold bit is latched on, |
|  | OTL 25117 | then latch prelude hold bit. |
| 3 | XIC 27117 | If all axes are in position, |
|  | XIC 2501 | and the index table gears are meshed, |
|  | XIC 2502 | and the index table is down, |
|  | XIC 26717 | and the system is in the prelude portion of the block execute, |
|  | OTL 02700 | then energize SOL A. |

-continued

| Rung No. | Instruction | Description |
|---|---|---|
| 4 | XIC 2500 | If the index table is up, |
|  | XIC 2501 | and if the index gear train is meshed, |
|  | OTU 25117 | then release prelude hold bit to allow rotation of table. |
| 5 | XIC 26617 | If the system is in the postlude portion of the block execute, |
|  | XIC 27117 | and if all axes are in commanded positon, |
|  | TON 030 | then turn timer at memory location 030 on and set the 15th bit to one when one second has elapsed. |
| 6 | XIC 03017 | When the timer at memory location 030 times out, |
|  | OTU 2700 | de-energize SOL A. |
| 7 | XIC 26617 | If the system is in the postlude portion of the block execute, |
|  | XIC 02502 | and if the index table is down, |
|  | XIC 0250 | and if the gear train is meshed, |
|  | OTU 25017 | then release postlude hold bit to allow system to execute next block of part program data. |

The entry of the machine dependent software (MDS) is performed by calling up the program editor. Referring to the flow chart of this micro-routine in FIG. 17, the program editor initializes parameters such as the rung cursor and clears the CRT display. The editor flags set by previous editing instructions are clared and then the word "start" is displayed on the CRT or a rung display subroutine is called up and the ladder diagram rung indicated by the rung cursor is displayed on the CRT. The editor then remains in a loop until a character is removed from the auxiliary keyboard 7.

Figure 18:
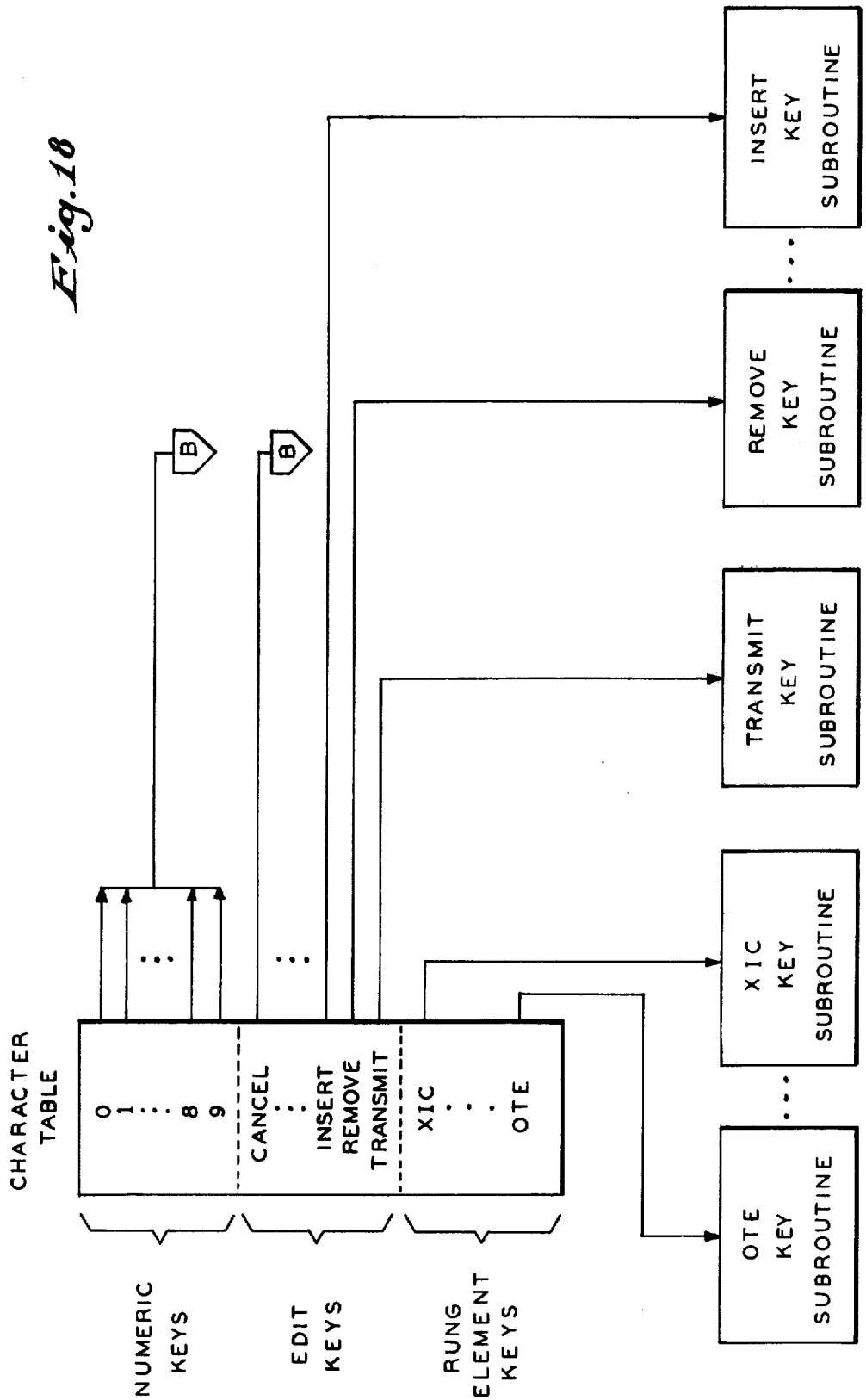

When an ASCII character is received its code is employed to look up, or map to the starting address of a subroutine associated therewith. Referring to FIG. 18, this mapping is accomplished by a character table 210 which occupies fifty lines of the main memory 34, one for each keyboard key. In response to the receipt of a numeric character (0-9), the contents of a respective one of the first ten lines of the character table 210 is read out and executed. Since a numeric character alone is meaningless, the contents of each line 0-9 is a jump instruction back to the entry point B in FIG. 17 to await the receipt of another character from the keyboard 7.

The edit keys used to develop the MDS routine and the rung element keys used to form the controller instructions each generate a unique ASCII character which addresses an associated line in the character table 210. The contents of these addressed lines are jump instructions which point to the start of a unique subroutine which performs the function or service required by its associated key. At the completion of the subroutines associated with the edit keys the program editor is re-entered at point B in FIG. 17 to await the receipt of the next keyboard character. On the other hand, at the completion of the rung element subroutines the program editor is re-entered at point A in order to update the CRT display by executing the rung display subroutine. Thus, as each rung element is entered into the MDS routine, that element is added to the ladder diagram displayed on the CRT display 9.

Figure 19A:
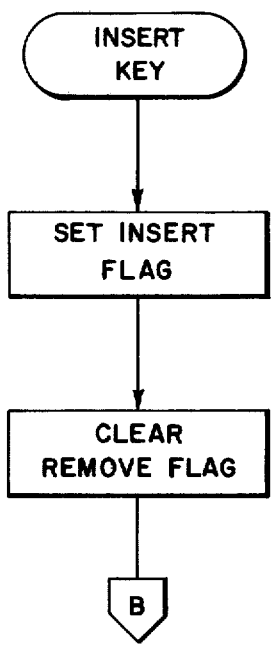
Figure 19B:
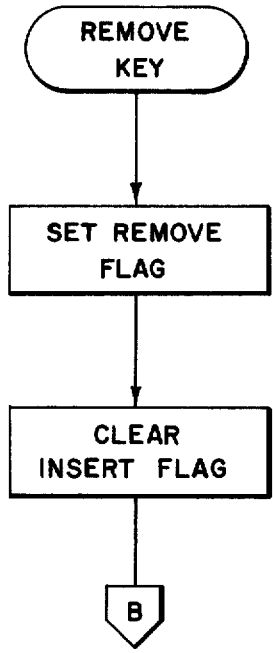
Figure 19C:
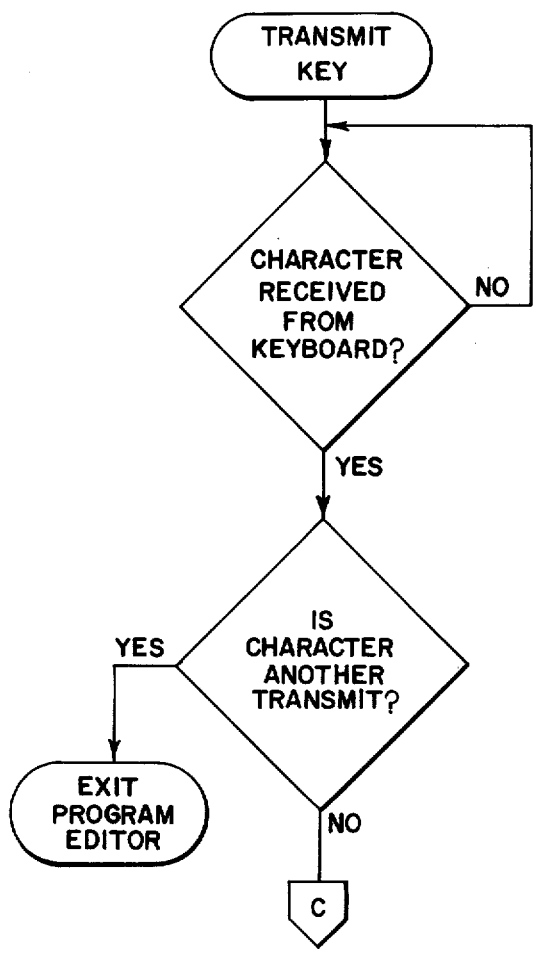

The subroutines for carrying out functions required by the editing keys are illustrated by the flow charts in FIGS. 19a-c for the insert, remove and transmit keys. The insert key subroutine merely sets an insert flag to "one" and clears any existing remove flag to zero and returns to entry point B of the program editor routine in FIG. 17. Similarly, the remove key subroutine sets the remove flag to one and clears any insert flag to zero. When the transmit key is depressed twice in succession the program editor is to be exited and control is to be relinquished back to the MDI keyboard 8. The transmit key subroutine of FIG. 19c therefore, waits in a loop for the next keyboard character to be received, and if it is another transmit, the subroutine and the program editor routine are exited. Otherwise, the routine returns to the entry point C of the program editor routine in FIG. 17.

Figure 20A:
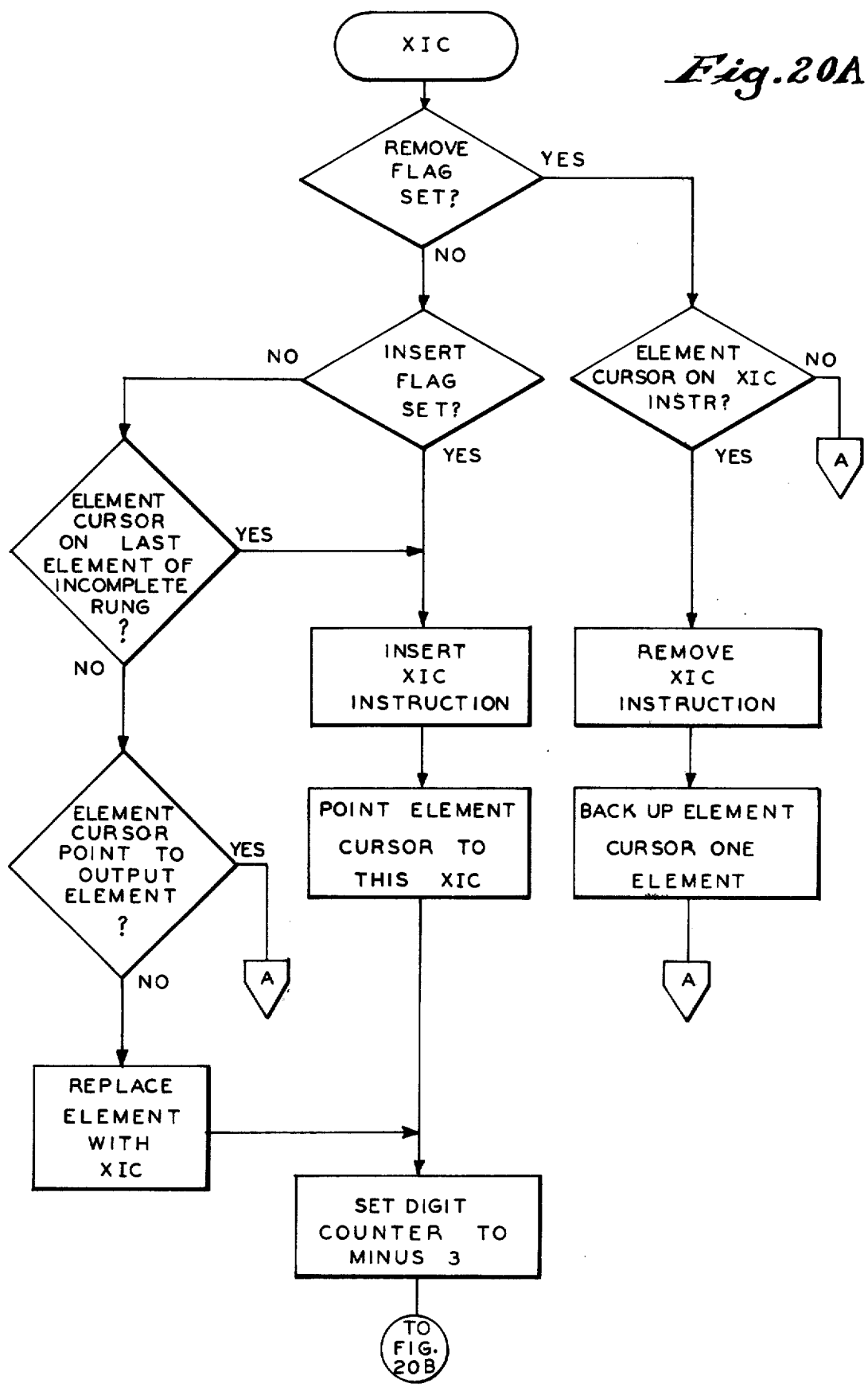

The rung element key subroutines are substantially more complex as illustrated by the XIC key subroutine flow chart of FIGS. 20a and b. This subroutine first checks to determine whether the XIC key was depressed as part of a remove or insert editing function. If the remove flag has been set and the element cursor is pointing at an XIC instruction presently stored in the MDS portion 187 of the main memory 34, that instruction is removed and the routine returns to the entry point A of the program editor. On the other hand, if the insert flag is set or if the element cursor points to the last element (controller instruction) of an incomplete rung (Boolean expression) a two-word XIC instruction is loaded into the main memory 34 and the element cursor is incremented to point at the memory locations in which the instruction is to be stored. If no insert is to be performed and the cursor is not pointed at an output element (such as an OTE instruction) the instruction to which the element cursor points is to be replaced by an XIC instruction. In any case, after loading the XIC operation code in the main memory 34, a digit counter is set to minus three in preparation for the receipt of three octal digits which form the second word of the XIC instruction.

Figure 20B:
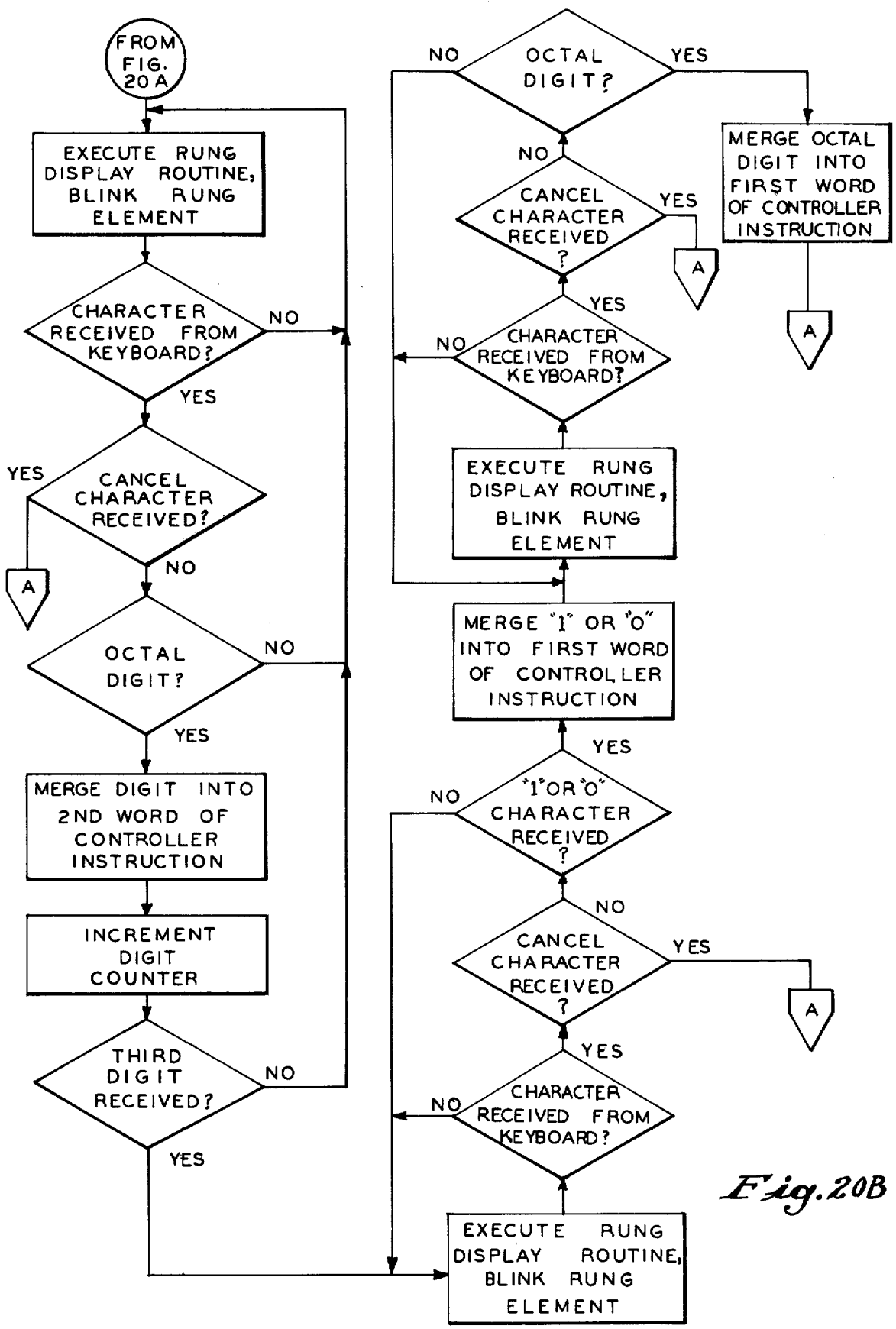

Referring particularly to FIG. 20b, a loop is established in the XIC key subroutine which waits for the three octal digits to be received or a command to cancel the instruction. As each octal digit is received it is loaded into the main memory 34 to form the second word of an XIC instruction. After the receipt of the three octal digits a second loop is established which awaits the receipt of the first bit (1 or 0) of the four-bit pointer code and loads it into the first word of the XIC instruction along with the XIC operation code. A third loop is then established which awaits the receipt of the final three bits of the bit pointer code (in the form of an octal digit) and loads them into the first word of the XIC instruction to complete its formation. The XIC key subroutine then returns to the entry point A of the program editor to await receipt of the next keyboard character. During the formation of the XIC instruction the rung displayed on the CRT display 9 is updated after each character is entered so that the operator can visually confirm the entry of the proper character as he operates the keyboard 7. The rung element thus being formed is also caused to blink by the XIC key subroutine so that the operator is made clearly aware of the rung element being formed and that further characters must be entered to complete the formation of the controller instruction.

By employing the auxiliary keyboard 7, the CRT display 9 and the program editor routine, the controller program in the above described example is entered into the MDS routine 187 in the main memory 34 and the ladder diagram relating to that program is constructioned on the CRT display 9. Although the system will accommodate large numbers of rungs, or Boolean expressions, and each rung may have enumerable branches and elements in it, the CRT display 9 is limited to displaying five lines at one time with up to 10 elements in any one line. The display can be scrolled up or down to show other rungs in the ladder diagram.

It should be apparent from the above example that programmable controller type instructions are single bit oriented rather than word oriented. That is, the logic state of single bits are examined or are set to a desired state. Also, the condition of a Boolean expression, or ladder diagram rung, must be retained as each instruction in the expression is executed. If the expression is satisfied (i.e., the rung is conductive), then the programmed event which is conditioned by the elements of the expression is to occur. Although not illustrated in the above example, Boolean expressions which may be satisfied by more than one set of conditions often occur in control applications. These expressions include one or more logical OR functions which may be viewed as parallel branches on the rung diagram. In such case the conditions specified in the main rung may be satisfied if any one of a plurality of parallel branches in the rung are satisfied.

Referring particularly to FIGS. 4a, 4b and 5, a programmable controller type of instruction is recognized when a macro-instruction loaded into the macro-instruction register 37 has an operation code which begins with 105, 1014, 1015, 1016 or 1017 (octal). The macro-decoder 38 detects these codes and reads out the starting address of the appropriate micro-routine from one of the mapper proms 42-45. These macro-routines are listed below, but the following is a general description of how the system solves Boolean expressions. The register R12 in the random access memory 69 is reserved to store the "rung condition flag," the register R13 is reserved to store the "branch condition flag," and the register R14 is reserved to store the "multiple branch condition flag." In a rung without branches the register R12 stores the state, or condition, of the rung. The register R12 is set to a logic 1 state at the outset and when an XIC instruction is executed, the register R12 is set to zero if the condition tested is false. If the condition tested is true, the register remains untouched with the result that if all conditions tested by a string of XIC instructions are true, the register R12 remains in its logic 1 state to indicate that the rung is conductive, or true. When an OTE or other similar instruction is then executed, the state of register R12 is examined and serves as the decision or solution of the Boolean expression.

When a BST instruction is executed a branch occurs in the rung and the content of register R12 is transferred to register R13 to save the main branch condition. The register R12 is set to 1 and the condition of register R14 is set to zero. If another BST instruction is executed before the previous branch is ended, the contents of register R12 is "ORed" with the contents of register R14 and the result stored in register R14. When a BND instruction is executed the branch or branches are terminated by "ORing" the contents of register R12 with register R14 and "ANDing" the result with the contents of register R13. The result is stored back into register R12 for the continuation of the main branch examination.

As indicated above, most programmable controller macro-instructions are comprised of two words. The first word is the operation code and the second word is the address in the main memory 34 of the operand. In an XIC or OTE instruction, for example, the second word identifies a line in the I/O image table 185, whereas the four least significant bits in the first word serve as a bit pointer which identifies the particular bit in that line. The macro-routine executed in response to an XIC or OTE instruction enables the bit pointer 40 to receive this four-bit pointer and generate a 16-bit mask on the processor bus 30 which is loaded into the L register 57. The mask is all ones except for the bit indicated by the pointer and when the operand is subsequently read from the main memory 34 it is logically combined in the ALU 59 with the mask to perform the desired function. For example, to execute an XIC instruction the operand is "inclusive ORed" with the mask, and if the ALU output is all ones, the identified status bit in the I/O image table 185 is true, or at a logic 1, and the register R12 remains unchanged. To execute an OTE instruction the mask is again stored in the L register 57. If the register R12 is a zero indicating that conditions have not been satisfied, the operand identified in the second word of the OTE instruction is "ANDed" in the ALU 59 with the mask and the result stored back in the I/O image table 185. If the conditions have been met, or in other words, register R12 is one, the mask is complemented, loaded back into the L register 57 and "ORed" with the operand. The result is loaded back into the I/O image table 185 at the same operand address. The micro-routines for some of the more representative programmable controller instructions are as follows:

| Label | Processor Function | ALU Function | Destination Code | Source Code | Skip/ Flag |
|---|---|---|---|---|---|
| XIC | READ | INC | P | P | |
| | | PASS | L | MASK | |
| | READ | | | ABT | |

| Label | Processor Function | ALU Function | Destination Code | Source Code | Skip/ Flag |
|---|---|---|---|---|---|
| | | IOR | | ABT | ONES |
| | ZERO | R12 | | | EOX |
| XIO | READ | INC | P | P | |
| | | CMPS | R8 | MASK | |
| | | PASS | L | R8 | |
| | READ | | | ABT | |
| | | AND | | ABT | ALZ |
| | | ZERO | R12 | | EOX |
| OTE | READ | INC | P | P | |
| | FLG | PASS | | R12 | AL15 |
| | | PASS | R8 | ABT | |
| | READ | | | R8 | |
| | | PASS | L | MASK | |
| | | CMPS | R10 | MASK | |
| | | AND | R9 | ABT | |
| | RSS | PASS | L | R10 | FLG |
| | | IOR | R9 | R9 | |
| | WRITE | | | R8 | |
| | | | ABT | | |
| | | ONES | R12 | | EOX |
| BST | | IMM | L | LOW, | 377B |
| | | XOR | | R14 | ALZ |
| | | JMP | | BST01 | |
| | | PASS | L | R14 | |
| | | IOR | R14 | R12 | |
| | | ONES | R12 | | EOX |
| BST01 | | PASS | R13 | R12 | |
| | | ONES | R12 | | |
| | | ZER | R14 | | EOX |
| BND | | PASS | L | R12 | |
| | | IOR | R14 | R14 | |
| | | PASS | L | R14 | |
| | | IMM | R14 | LOW | 377B |
| | | AND | R12 | R13 | EOX |

The timer instructions (TON 0.1, TON 1.0, TOF 0.1 and TOF 1.0) require considerably more complex micro-routines and employ the real-time clock 145. As with the others, the timer instructions are comprised of two memory words. The first word in a timer instruction is the operation code and the second word is the memory address of an accumulated time in a timer/counter portion 192 of the main memory 34. As shown in FIG. 10, this portion of the memory is stored between the I/O image table 185 and the system flag table 192 at relative memory lines 030 through 177 (octal). In addition to an accumulated timer value associated with each timer instruction, a preset time value is stored in the adjacent memory location of the storage portion 192, and thus, a total of four memory lines are required for each timer instruction.

Referring particularly to FIGS. 8 and 11, the least significant bit of the operation code word indicates the selected time range. When the timer instruction operation code is read into the macro-instruction register 37, this bit is coupled through the lead 151 to the real-time clock circuit 145 where a 1 enables the application of the 5 hz. clock to the flip-flop 146 (0.1 seconds per cycle) and a 0 enables the 0.5 hz. clock (1.0 second per cycle). The TIM source micro-order code causes a logic high voltage to be generated on the TIM lead 155 and the state of the selected real-time clock is thus gated onto the least significant digit lead of the data processor bus 30. As will become apparent from the micro-routine below, the state of the real-time clock is compared with the least significant bit in the accumulated time value. This comparison occurs at least once every 10.24 milliseconds and if the states are different, this indicates that the real-time clock has incremented and that the accumulated time for that timer should be incremented one count as well. The micro-routine also checks to determine whether the timer has "timed out." This is accomplished by comparing the accumulated time value with the preset time value. A first status bit (No. 15) in the preset value word indicates whether the timer is timing or not and a second status bit (No. 13) in the same word indicates whether the timer has timed out. Thus, when the accumulated time value is equal to or greater than the preset time value, the status bit number 13 is set to one and may be examined by subsequent instructions in the machine dependent software routine 187. Whether a timer is to be energized or not is determined by the status of the rung, or Boolean expression, of which it is a part. This status is indicated by the register R12 of random access memory 69 and is stored as the first status bit in the preset value word. The micro-routine for executing the TON (1.0) and TON (0.1) macroinstructions is as follows:

| Label | Processor Function | ALU Function | Destination | Source | Skip/ Flag | Description |
|---|---|---|---|---|---|---|
| TON | FLG | PASS | | R12 | AL15 | Set processor flag if rung is true. |
| | | INC | P | P | | Increment program counter and |
| | | | R8 | ABT | | put address of accumulated time value in register R8. |
| | READ | INC | R13 | R8 | | Get accumulated time value and put |
| | | ZERO | R10 | | | in register R9 and |
| | | PASS | R9 | ABT | | put address of preset time value in register R13. |
| | READ | | | R13 | | Get the preset time value. |
| | | IMM | L | HIGH | 360B | Load 0000 1111 1111 into L register and |
| | | ZERO | R11 | | | set register R11 to zero. |
| | | AND | R12 | ABT | FLG | Load preset time value into register R12. |
| | JMP | | | RESET | | If processor flag is zero jump to RESET. |
| | | PASS | L | R9 | | Load accumulated time value into L register. |
| | CYFL | SUB | | R12 | AL15 | Compare accumulated time value with preset time value. |
| | JMP | | | TON01 | | If accumulated value is less, jump to TON01. |
| | | IMMC | R11 | HIGH | 240B | Form: 1010000000000000 |
| | | PASS | L | R11 | | and load into register. |
| | | IOR | R12 | R12 | | Combine L register with preset value and |
| | WRTE | | | R13 | | write result back |
| | | | ABT | R12 | | into memory 34. |
| | | ONES | R12 | | EOX | Load ones into register R12 and exit. |
| TON01 | RSS | XOR | | TIMR | AL0 | Compare state of real-time clock with accumulated time value in L register. |
| | | INC | R9 | R9 | | If different, increment accumulated time value in register R9. |
| | WRTE | INC | R8 | R8 | | Write accumulated |
| | | PASS | ABT | R9 | | time value back into memory 34. |
| | L1 | PASS | R12 | R12 | | Set status bit 15 |
| | R1 | LWF | R12 | R12 | | of preset value word to one and |
| | WRTE | INC | | R8 | | write entire word |
| | | | ABT | R12 | | back into memory 34. |
| | | ONES | R12 | | EOX | Set register R12 to all ones and exit. |
| RESET | WRTE | INC | R8 | R8 | | Write zeros into |
| | | PASS | ABT | R10 | | accumulated value line of memory 34. |
| | | PASS | L | R11 | | Load register R11 which is all zeros in L register |
| | | IOR | R12 | R12 | | Combine L register with preset value word and store in register R12. |
| | WRTE | | | R8 | | Write preset value |
| | | PASS | ABT | R12 | | word back into memory 34 and |

| Label | Processor Function | ALU Function | Destination | Source | Skip/Flag | Description |
|---|---|---|---|---|---|---|
| | | ONES | R12 | | EOX | Write ones in register R12 and exit. |

The other timer macro-instructions are executed in similar fashion although the status bits in the preset value word are employed differently. Note that registers R12 and R13 are used as scratch pads in the timer micro-routines and the rung condition register R12 is set to one at the completion of the micro-routine so that it may again serve as the run condition storage means.

MICRO-ROUTINE APPENDIX

| LABEL | FUNC | ALU | DEST | SOURCE | SEQ | COMMENT |
|---|---|---|---|---|---|---|
| INTERRUPT SERVICE MICRO-ROUTINE | | | | | | |
| INTRP | DWEL | PASS | R4 | CIR | | Load interrupt I/O address into R4, read out and execute macro-instruction at memory location indicated by interrupt I/O address. |
| | READ | | | R4 | | |
| | | PASS | IR | ABT | | |
| | READ | | | ADDR | MAP | |
| PROGRAMMED DATA INPUT MICRO-ROUTINE | | | | | | |
| LIAB | IOG | NOP | NOP | NOP | NOP | Input data from I/O address indicated by six least significant bits in register 37 and load in A or B register. |
| | DWEL | PASS | CAB | IOI | EOX | |
| PROGRAMMED DATA OUTPUT MICRO-ROUTINE | | | | | | |
| OTAB | IOG | NOP | NOP | NOP | NOP | Output data from A or B register to I/O device addressed by six least significant bits in register 37. |
| | DWEL | PASS | IOO | CAB | EOX | |
| INPUT SCAN MICRO-ROUTINE | | | | | | |
| INPT | READ | INC | P | P | | Eight sixteen-bit words are read into the I/O image table of the main memory from eight successive I/O addresses. |
| | | IMMC | R10 | HIGH | 205B | |
| | | IMM | R14 | LOW | 377B | |
| | | PASS | R8 | ABT | | |
| | READ | INC | P | P | | |
| | | IMMC | R9 | LOW | 100B | |
| | | PASS | L | R9 | | |
| | | IOR | R9 | ABT | | |
| | READ | INC | P | P | | |
| | | PASS | L | R10 | | |
| | | IOR | R9 | R9 | | |
| | RSS | PASS | R10 | ABT | ALZ | |
| | | ONES | R12 | | EOX | |
| | | IMM | CNTR | LOW | 7 | |
| INPT0 | R1 | PASS | R10 | R10 | AL0 | |
| | | JMP | | | INPT1 | |
| | | PASS | IR | R9 | | |
| | IOG | | | | | |
| | DWEL | PASS | R11 | IOI | | |
| | WRTE | INC | | R8 | | |
| | | PASS | ABT | R11 | | |
| INPT1 | | DEC | R8 | R8 | | |
| | | INC | R9 | R9 | CNT4 | |
| | ICNT | JMP | | | INPT0 | |
| | | ONES | R12 | | EOX | |
| OUTPUT SCAN MICRO-ROUTINE | | | | | | |
| OUTP | READ | INC | P | P | | Eight sixteen-bit words are read out of successive lines in the I/O image table of the main memory to eight successive I/O addresses. |
| | | IMMC | R10 | HIGH | 205B | |
| | | PASS | R8 | ABT | | |
| | READ | INC | P | P | | |
| | | IMMC | R9 | LOW | 200B | |
| | | PASS | L | R9 | | |
| | | IOR | R9 | ABT | | |
| | READ | INC | P | P | | |
| | | PASS | L | R10 | | |
| | | IOR | R9 | R9 | | |
| | RSS | PASS | R10 | ABT | ALZ | |
| | | PASS | | | EOX | |
| | | IMM | CNTR | LOW | 7 | |
| OUTP0 | R1 | PASS | R10 | R10 | AL0 | |
| | | JMP | | | OUTP1 | |
| | READ | INC | | R8 | | |
| | | PASS | IR | R9 | | |
| | | PASS | R11 | ABT | | |
| | IOG | | | | | |
| | DWELL | PASS | IOO | R11 | | |
| OUTP1 | | DEC | R8 | R8 | | |
| | | INC | R9 | R9 | CNT4 | |
| | ICNT | JMP | | | OUTP0 | |
| | | PASS | | | EOX | |
| FETCH MICRO-ROUTINE | | | | | | |
| FETCH | READ | INC | P | P | | Read macro-instruction from memory line indicated by P register into macro-instruction |
| | ION | PASS | R1 | DSPL | | |
| | CFLG | PASS | IR | ABT | | |

-continued

| | READ | INC | R8 | ADDR | MAP | register and map to proper micro-routine. |

SYSTEM FLAG TABLE APPENDIX

| MEMORY LOCATION | MNEMONIC | DESCRIPTION |
|---|---|---|
| 200 | FPHW1 | Front Panel Status |
| 201 | FPHW2 | Front Panel Status |
| 202 | FPHW3 | Front Panel Status |
| 203 | SPECL | Reserved |
| 204 | $TELK | Tape Edit Lockout |
| 205 | $MSTP | Auto Restart Request |
| 206 | HOMWD | Axis Home Word Bit 0 = 1st axis, Bit 1 = 2nd axis, etc. |
| 207 | OVLWD | Overtravel Bit 0 = 1st axis plus Bit 1 = 1st axis minus, etc. |
| 210 | /TOL/ | Tool in Drum Display MSW |
| 211 | /TOL/ | Tool in Drum Display LSW |
| 212 | %TOOL | Tool in Spindle Display MSW Also used to select |
| 213 | %TOOL | Tool in Spindle Display LSW offset when $TOOL is set. |
| 214 | %JSPD | Jog Speed Increment |
| 215 | $RPM | Spindle Speed Display |
| 216 | $PALT | True equal B fixture offsets - False equal A fixture off. |
| 217 | $CSLK | Stored Program Edit Lockout |
| 220 | $M00 | Decoded M00 |
| 221 | $M01 | Decoded M01 |
| 222 | $M02 | Decoded M02 |
| 223 | $M03 | CRT Set for Display Purposes |
| 224 | $M04 | CRT Set for Display Purposes |
| 225 | $M05 | CRT Set for Display Purposes |
| 226 | $M06 | Decoded M06 |
| 227 | $M07 | CRT Set for Display Purposes |
| 230 | $M08 | CRT Set for Display Purposes |
| 231 | $M09 | CRT Set for Display Purposes |
| 232 | $M30 | Decoded M30 |
| 233 | $M49 | Decoded M49 False for M48 |
| 234 | !WMR | Warning Message Display Left Line 1 Octal Value |
| 235 | !EMR | Emergency Message Display Right Line 1 Octal Value |
| 236 | | |
| 237 | | |
| 240 | | |
| 241 | | |
| 242 | | |
| 243 | | |
| 244 | | |
| 245 | | |
| 246 | $EOB | Request End of Block Stop |
| 247 | $TOOL | Tool Transfer Complete |
| 250 | $SPST | Request Post BLock Time (Transfer Inhibit) |
| 251 | $SPRE | Request Pre Block Time |
| 252 | $PSTR | Request Cycle Start |
| 253 | $PSTP | Request Cycle Stop |
| 254 | | |
| 255 | $JGHD | Request Jog Hold |
| 256 | $ININ | Request Feed Hold |
| 257 | $EMER | Request Emergency Stop |
| 260 | #INPO | Which Axis is In-Position, Bit 0 = axis, 1, etc. |
| 261 | %SPED | Spindle Speed Override × $2^{14}$ (16384 = 100%) |
| 262 | FPHW4 | Front Panel Outputs |
| 263 | FPHW5 | Front Panel Outputs |
| 264 | $XFER | Data Transfer from Buffer to Active |
| 265 | $PTO | Power Turned On/Cleared When E-stop Reset |
| 266 | $PSTX | Post Block Time |
| 267 | $PREX | Pre Block Time |
| 270 | $MCUR | MCU Reset |
| 271 | $INPO | All Axes In-Position |
| 272 | $INOV | Inhibit Spindle and Feedrate Overrides |

| | | | CSTR | CSTM | |
|---|---|---|---|---|---|
| 273 | $CSTR | Cycle On | 0 | 1 | Cycle Stop Requested |
| | | | 1 | 0 | At End of Block |
| 274 | $CSTM | Cycle On | 1 | 1 | Block Executing |
| 275 | $ACTR | Active Reset | | | |
| 276 | #SWIC | Which Axes in Metric Bit 0 = 1st axis, etc. | | | |
| 277 | #INMT | Metric Mode | | | |

| | | |
|---|---|---|
| 300 | | |
| 301 | | |
| 302 | !!0FT | G92/G98 Buffer Address (LSW thru MSW) |
| 303 | /XX | CAR Position Address (LSW thru MSW) |
| 304 | %MODE | Mode Select |
| 305 | %MACZ | Machine Zero |
| 306 | %INCR | Jog Function Select MSW |
| 307 | %INCR | Jog Function Select LSW |
| 310 | %GRID | Grid Zero |
| 311 | %FNSL | Axis Select |
| 312 | %FEED | Feedrate Override × $2^{14}$ (16384 = 100%) |
| 313 | $TPRG | T Programmed |
| 314 | $SPRG | S Programmed |
| 315 | $MPRG | M Programmed |
| 316 | $ENDP | End Point |
| 317 | $BPRG | B Programmed |
| 320 | | |
| 321 | | |

-continued

| | | |
|---|---|---|
| 322 | $ENTE | Tape Edit |
| 323 | $DDNC | DNC |
| 324 | $RDRB | RDR B |
| 325 | $RDRA | RDR A |
| 326 | $TEST | Test Mode |
| 327 | $MIR | Mirror Image |
| 330 | $HOLD | Feed Hold |
| 331 | $BLCM | Block Complete |
| 332 | $MOM1 | Program Stop |
| 333 | $EDPS | End of Program |
| 334 | !BVAL | Programmed B Word Value MSW |
| 335 | !BVAL | Programmed B Word Value LSW |
| 336 | /FD/ | F Word Display MSW |
| 337 | !FDIS | F Word Display LSW |
| 340 | !CUR2 | Programmed Word Bit Pattern |
| 341 | !VDM2 | Feed Mode G93 = 0, G94 = 1, G95 = 2 (numeric) |
| 342 | !DWL2 | Dwell Mode G04 = +1 |
| 343 | !G982 | Axis Preset G92G98 = 1, G99 = 2, G70 = 4, G71 = 8 (bit) |
| 344 | !CAN2 | Fixed Cycle Mode G80 = 0, G81 = 1, G82 = 2, etc. (numeric) |
| 345 | !CCM2 | Cutter Comp Mode G40 = 0, G41 = 1, G42 = 2 (numeric) |
| 346 | !PLN2 | Plane Code G17 = 3, G18 = 5, G19 = 6 (numeric) |
| 347 | !ABN2 | Absolute/Incremental G90 = 0, G91 = 1 bit |
| 350 | !MOD2 | Linear/Circular G00 = 0, G01 = 1, G02 = 2, G03 = 3, G33 = 4 (numeric) |
| 351 | !MVAL | Programmed M Word Value |
| 352 | !TVAL | Programmed T Word Value MSW |
| 353 | !TVAL | Programmed T Word Value LSW |
| 354 | !SVAL | Programmed S Word Value MSW |
| 355 | !SVAL | Programmed S Word Value LSW |
| 356 | !FVAL | Programmed F Word Value MSW |
| 357 | !FVAL | Programmed F Word Value LSW |
| 360 | | |
| 361 | | |
| 362 | | |
| 363 | | |
| 364 | | |
| 365 | | |
| 366 | | |
| 367 | | |
| 370 | | |
| 371 | | |
| 372 | | |
| 373 | | |
| 374 | | |
| 375 | | |
| 376 | | |
| 377 | | |

COMPONENT APPENDIX

| Component | Reference No. | Description |
|---|---|---|
| Tape Reader | 5 | Model TRS 9200BBDED manufactured by EECO. |
| CRT Display | 9 | Model TV-12 manufactured by Ball Brothers. |
| Micro-instruction Register | 31 | Four SN74174 Rex D-type registers manufactured by Texas Instruments, Inc. |
| Micro-program Read-only Memory | 32 | Twelve 82S131 bipolar PROMs (512 × 4) manufactured by Signetics. |
| Main Memory | 34 | Thirty-four TMS4030 dynamic memory arrays manufactured by Texas Instruments, Inc. |
| Memory Data Register | 35 | Four SN7475 quad latches manufactured by Texas Instruments, Inc. |
| Memory Address Register | 36 | Four SN7475 quad latches manufactured by Texas Instruments, Inc. |
| Macro-instruction Register | 37 | Four SN7475 quad latches manufactured by Texas Instruments, Inc. |
| Bit Pointer Circuit | 40 | SN74154 4-line-to-16-line decoder manufactured by Texas Instruments, Inc. |
| Mapper Proms | 42–45 | Four SN74S288 bipolar PROMs (32 × 8) manufactured by Texas Instruments, Inc. |
| Micro-program Sequencer | 47 | SN74S163 synchronous binary counter manufactured by Texas Instruments, Inc. |
| Priority Mapper Prom | 50 | SN74S288 bipolar PROM (32 × 8) manufactured by Texas Instruments, Inc. |
| L-Register | 57 | Three SN74174 hex D-type registers manufactured by Texas Instruments, Inc. |
| Arithmetic and Logic Unit | 59 | Four SN74S181 ALUs manufactured by Texas Instruments, Inc. |
| Shifter | 63 | Eight SN74LS253 dual, four- |

| | | |
|---|---|---|
| | | to-one multiplexers manufactured by Texas Instruments, Inc. |
| A Register | 67 | Two SN74198 eight-bit shift registers manufactured by Texas Instruments, Inc. |
| B Register | 68 | Three SN74174 hex D-type registers manufactured by Texas Instruments, Inc. |
| RAM | 69 | Four SN74S189 bioplar RAMs (16 × 4) manufactured by Texas Instruments, Inc. |
| Multiplexer | 72 | Four SN74S257 quad two into one multiplexers manufactured by Texas Instruments, Inc. |
| Data Latch | 77 | Two SN74116 eight-bit latches manufactured by Texas Instruments, Inc. |
| Multiplexer | 80 | One SN74S257 quad two into one multiplexer manufactured by Texas Instruments, Inc. |
| Multiplexer | 97 | Four SN74S257 quad two into one multiplexers manufactured by Texas Instruments, Inc. |
| Exclusive NOR Gates | 102–104 | SN7486 manufactured by Texas Instruments, Inc. |
| BCD Decoder | 105 | SN74145 four into ten decoder manufactured by Texas Instruments, Inc. |
| Save Register | 120 | Three SN74174 hex D-type registers manufactured by Texas Instruments, Inc. |
| Multiplexer | 122 | One SN74S257 quad two into one multiplexer manufactured by Texas Instruments, Inc. |
| Binary Encoders | 130 and 132 | SN74148 priority encoders manufactured by Texas Instruments, Inc. |
| Data Latch | 131 | SN74174 hex D-type register manufactured by Texas Instruments, Inc. |
| Repeat Counter | 141 | Two SN74S163 synchronous binary counters manufactured by Texas Instruments, Inc. |
| Output Address Register | 93 | Two SN7475 quad latches manufactured by Texas Instruments, Inc. |
| Binary-to-Octal Decoder | 165 | SN74S138 three into eight decoder manufactured by Texas Instruments, Inc. |

We claim:

1. An industrial control processor which comprises:

a read/write memory for storing multi-bit words which include an I/O image table and program instructions;

a multi-lead data processor bus coupled to said read/write memory to convey words which are written into or read out of said read/write memory;

an instruction register connected to said processor data bus and operable to receive and store program instructions read out of said read/write memory;

an arithmetic and logic unit having a first set of inputs connected to the leads in said data processor bus;

an L register having a set of inputs connected to the leads in said data processor bus and a corresponding set of output terminals connected to a second set of input terminals on said arithmetic and logic unit;

a bit pointer circuit having a set of inputs coupled to the instruction register to receive a bit pointer code contained in selected program instructions and having a set of output terminals connected to the respective leads in said processor data bus, said bit pointer circuit being responsive to received bit pointer codes to generate a mask on said processor data bus which is coupled to and stored in said L register;

wherein said mask is logically combined in said arithmetic and logic unit with a word read out of the I/O image table in said read/write memory to perform a logic operation on a selected single bit in said word.

2. The industrial control processor of claim 1 in which said mask is generated by said bit pointer circuit by driving all but a selected one of the leads in said processor data bus to a predetermined logic state and driving said one selected lead to another logic state, and wherein said selected one lead is determined by said bit pointer code.

3. The industrial control processor of claim 1 in which a rung condition storage register has an input coupled to an output terminal on said arithmetic and logic unit to store the result of the logical operation performed on said selected single bit.

4. The industrial control processor of claim 3 which includes a read-only memory which stores a plurality of micro-programs, each comprised of a set of micro-instructions, a micro-instruction register coupled to said read-only memory to receive and store a micro-instruction read therefrom, addressing means coupled to said instruction register and said read-only memory for selecting a micro-routine stored in said read-only memory in response to a code in the program instruction stored in said instruction register and for sequentially reading out the micro-instructions in said selected micro-routine to said micro-instruction register, and means coupling said micro-instruction register to said arithmetic and logic unit for selecting the logical operation performed by said arithmetic and logic unit from a set of such operations in response to a code in a micro-instruction stored in said micro-instruction register.

5. The industrial control processor of claim 4 which includes a real-time clock having an output terminal which alternately changes logic state and a logic gate which couples the real-time clock output terminal to said processor data bus in response to a selected code in the micro-instruction in said micro-instruction storage register.

6. The industrial control processor of claim 5 in which said read/write memory includes a timer storage portion having a plurality of accumulated time words and a corresponding number of associated preset time words, said industrial control processor including means for selectively reading an accumulated time word out of said read/write memory and comparing the logic state of the least significant bit therein with the logic state of said read-time clock output terminal, and means for reading the associated preset time word out of said read/write memory and arithmetically comparing its value with the value of said accumulated time word.

7. A numerical control system which comprises:

I/O interface rack means including a slot having a plurality of output circuits for driving discrete digital operating devices, a slot having a plurality of input circuits for receiving status signals from a plurality of discrete digital sensing devices, a slot having a command register for storing a position command word to be applied to a servo mechanism, and a slot having an accumulator register for storing a feedback word received from said servo mechanism;

a tape reader for reading a part program and generating blocks of part program data;

an industrial control processor connected to said I/O interface rack means and said tape reader, said industrial control processor including:

a memory which stores a. background programs, each comprised of a plurality of program instructions;

b. a machine dependent software program comprised of a plurality of controller instructions;

c. an I/O image table comprised of a plurality of multi-bit memory words, each word associated with one of the slots in said I/O interface rack means;

d. a system flag table comprised of a plurality of memory locations;

e. a tape reader driver program comprised of a plurality of program instructions; and f. a timed interrupt program comprised of a plurality of program instructions;

means responsive to a signal received from said tape reader and program instructions in said tape reader driver program for coupling a block of part program data generated by said tape reader to said memory;

means responsive to part program data stored in said memory and program instructions in one of said background programs for setting a selected memory location in said system flag table to a selected logic state;

means for periodically executing said timed interrupt program including:

a. means responsive to program illustrations in said timed interrupt program for coupling data between said respective I/O image table memory words and their associated slots to update the status of the I/O image table;

b. means responsive to program instructions in said timed interrupt program, responsive to part program data stored in said memory and responsive to the feedback word stored in the I/O image table for calculating a position command word and storing it in the I/O image table memory word which is associated with the I/O interface rack slot containing the command register; and c. means for executing control instructions in said machine dependent software program to examine the status of selected bits in said I/O image table, to examine the state of selected memory locations in said system flag table, and to set the status of selected bits in said I/O image table.

8. The numerical control system as recited in claim 7 in which said means for executing control instructions includes:

means responsive to a memory address in a control instruction to read a selected multi-bit memory word in said I/O image table from said memory; and a bit pointer circuit which is responsive to a bit pointer code in a control instruction read from said memory to select a bit in said multi-bit memory word.

9. The numerical control processor as recited in claim 7 which includes a manually operable keyboard connected to said industrial control processor for generating digital characters thereto and said industrial control processor includes means responsive to program instructions in one of said background programs for coupling the digital characters received from said keyboard to the memory to form operation codes for controller instructions in said machine dependent software program.

10. The numerical control system as recited in claim 9 which includes a cathode ray tube display connected to said industrial control processor for receiving digital characters and displaying corresponding symbols, and said industrial control processor includes means responsive to program instructions in one of said background programs to generate a set of digital characters to said cathode ray tube display which correspond to the respective operation codes in a selected set of controller instructions in said machine dependent software program, and wherein said set of controller instructions represent a complete Boolean expression and the corresponding displayed symbols are arranged on the screen of said cathode ray tube to form a rung of a ladder diagram.

11. The numerical control system as recited in claim 10 in which the set of controller instruction operation codes is manually selected by means of said keyboard.

12. An industrial control processor controlling in response to blocks of part program data coupled to it the motion of a cutting tool on a machine tool and for controlling the discrete digital devices associated with the machine tool, the industrial control processor comprising:

means for storing a received block of part program data;

means for storing a position command word for each axis of motion on said controlled machine tool;

I/O image table storage means including a storage location for each discrete digital sensing device associated with the controlled machine tool and for each discrete digital operating device associated therewith;

system flag table storage means including a plurality of storage locations;

means for decoding a block of part program data and in response thereto setting a selected storage location in said system flag table storage means to a logic state which indicates that a specific auxiliary function is to be performed by said discrete digital devices;

means coupled to said data block storage means for calculating a position command word for each axis of motion and coupling each to its respective position command word storage means;

means for coupling said calculated position command words to said controlled machine tool to operate the axis servo mechanisms thereon;

means for storing a plurality of controller instructions which comprise a machine dependent software routine; and timed interrupt means for periodically interrupting all other functions of the industrial control processor to execute the machine dependent software and to couple data between said discrete digital devices and said I/O image table storage means, said timed interrupt means including:

a. means responsive to selected controller instructions for examining the logic state of selected sensing device storage locations in said I/O image table and responsive to other selected controller instructions for examining the logic state of storage locations in said system flag table; and b. means responsive to selected controller instructions for setting the logic state of selected operating device storage locations in said I/O image table.

13. The industrial control processor of claim 12 in which said I/O image table storage means is arranged to form a plurality of addressable words, each word containing a plurality of storage locations, and said controller instructions which examine selected storage locations and said controller instructions which set the logic state of selected storage locations each include an address which selects a word in said I/O image table storage means and a bit pointer code which selects a storage location in that word.

14. An industrial control processor comprising:
a read/write memory comprised of a plurality of addressable multi-bit words, said read/write memory storing at a selected set of memory addresses an I/O image table and storing a program comprised of a plurality of controller instructions which each contain a selected one of a set of operation codes;

a processor data bus coupled to said read/write memory for reading words out of and writing words into said read/write memory;

a macro-instruction register coupled to said processor data bus for receiving and storing controller instructions read out of said read/write memory;

a read-only memory for storing a set of addressable micro-routines, each of which corresponds to one of said operation codes in said set and each of which includes a unique set of micro-instructions;

means coupled to said macro-instruction register and said read-only memory for receiving the operation code in a controller instruction stored in said macro-instruction register and in response thereto addressing its corresponding micro-routine in said read-only memory; and means for sequentially executing the micro-instructions in an addressed micro-routine including:

a. means responsive to a selected micro-instruction and responsive to a memory address code in a controller instruction stored in said macro-instruction register to read out a selected memory word in said I/O image table;

b. a bit pointer which is enabled by a selected micro-instruction and is responsive to a bit pointer code in a controller instruction stored in said macro-instruction register to select a bit in a memory word read from said I/O image table; and c. means responsive to a selected micro-instruction for performing a logical operation with a selected bit from said I/O image table.

15. An industrial control processor as recited in claim 14 which includes:
a system flag table stored at a selected set of read/write memory addresses; and
means for receiving part program input data which indicates a function to be performed and for setting a bit in said flag table which corresponds to that function;
wherein selected controller instructions include address codes which enable said micro-instruction execution means to read out a memory word from said system flag table and perform a logical operation with a bit therein.

16. An industrial control processor as recited in claim 14 which includes a plurality of I/O slots coupled to said processor data bus, each associated with one memory word in said I/O image table; I/O slot including a plurality of circuits suitable for coupling to respective external devices, and each circuit associated with a respective single bit in said one memory word.

17. An industrial control processor as recited in claim 16 which includes means for periodically and continuously coupling data between said I/O image table memory words and their associated I/O slots.

18. A numerical control system comprising:
a cabinet which forms an enclosed space and which includes a front door;
a cathode ray tube display mounted to said cabinet door for displaying an image on a screen to an operator disposed in front of the cabinet;
a keyboard mounted to said cabinet door for operation by said operator, said keyboard including a set of keys marked with symbols which represent elements of a ladder diagram;
a tape reader mounted to said cabinet door for operation by said operator, said tape reader being operable to read blocks of part program data from a tape which directs the operation of a machine to be controlled by the numerical control system;
an I/O interface rack mounted to the cabinet and disposed within its enclosed space, said I/O interface rack including: a plurality of output circuits each connected to drive an associated operating device on the machine to be controlled; and a plurality of input circuits each connected to receive a status signal from an associated sensing device on the machine to be controlled; and an industrial control processor mounted to said cabinet within its enclosed space and connected by cables to said cathode ray tube display, said keyboard, said tape reader and said I/O interface rack, said industrial control processor including:
means for generating signals to said output circuits in said I/O interface rack, said generating means being responsive to status signals received from said input circuits, and responsive to part program data received from said tape reader, said generating means including means for storing a machine dependent software program comprised of a plurality of controller instructions;
means responsive to the manual operation of one of said set of keys on said keyboard for loading into said machine dependent software program storage means a digital code which corresponds to the symbol on said key; and
means responsive to the manual operation of one of said set of keys on said keyboard for coupling a digital character to said cathode ray tube display which generates a ladder diagram symbol on the screen that corresponds to the symbol on said one key.

19. The numerical control system as recited in claim 18 in which said I/O interface rack includes means for storing a position command data word and coupling the same to said machine to be controlled, and said industrial control processor includes means for calculating position command data words in response to part program data received from said tape reader.

20. An industrial control processor for controlling in response to blocks of part program data coupled to it the motion of a cutting tool on a machine tool and for controlling the discrete digital devices associated with the machine tool, the industrial control processor comprising:
means for storing a received block of part program data;
means for storing a position command word for each axis of motion on said controlled machine tool;
I/O image table storage means including a storage location for each discrete digital sensing device associated with the controlled machine tool and for each discrete digital operating device associated therewith;
system flag table storage means including a plurality of storage locations;
means for decoding a block of part program data and in response thereto setting a selected storage location in said system flag table storage means to a logic state which indicates that a specific auxiliary function is to be performed by said discrete digital devices;
means coupled to said data block storage means for calculating a position command word for each axis of motion and coupling each to its respective position command word storage means;
means for coupling said calculated position command words to said controlled machine tool to operate the axis servo mechanisms thereon;
means for storing a plurality of controller instructions which comprise a machine dependent software routine;
means for periodically executing said machine dependent software routine to set the logic state of selected operating device storage locations in said I/O image table in response to the logic state of selected sensing device storage locations in said I/O image table and selected storage locations in said system flag table; and
means for coupling data between said I/O image table and the discrete digital devices associated with the controlled machine.

21. The industrial control processor of claim 20 having means for developing and editing said machine dependent software routine which comprises:
keyboard means having a first set of manually operable keys for generating a first set of character table codes which correspond to a set of controller instruction operation codes, a second set of manually operable keys for generating a second set of character table codes which correspond to numeric values, and a third set of manually operable keys for generating a third set of character table codes which correspond to a set of editing functions;
means responsive to said first set of character table codes generated by said keyboard means for selectively generating controller instruction operation codes to said machine dependent software routine storage means;
means responsive to said second set of character table codes generated by said keyboard means for selectively generating binary coded numbers to said machine dependent software routine storage means; and
means responsive to said third set of character table codes generated by said keyboard means for selectively performing editing functions on controller instructions stored in said machine dependent software routine storage means.

22. The industrial control processor of claim 21 in which said means for developing and editing said machine dependent software routine further includes:
display means for generating ladder diagrams in response to a received set of codes; and
means coupled to said display means and said machine dependent software routine storage means for generating a set of codes to said display means which correspond to a selected set of controller instructions that comprise a Boolean expression.

* * * * *

PAGE ONE OF FOUR

UNITED STATES PATENT OFFICE
CERTIFICATE OF CORRECTION

Patent No. 4,038,533    Dated 7/26/77

Inventor(s) Ernst Dummermuth et al

It is certified that error appears in the above-identified patent and that said Letters Patent are hereby corrected as shown below:

| | |
|---|---|
| Column 1, line 41 | "hardward" should be -- hardware -- |
| Column 2, line 60 | "necessary" should be -- necessarily -- |
| Column 3, line 3 | "Fig." should be -- Figs. -- |
| Column 3, line 29 | "whic" should be -- which -- |
| Column 4, line 27 | "12" should be -- 10. A secondary control panel 12 --. |
| Column 6, line 18 | "but" should be -- bus -- |
| Column 6, line 38 | "mirco" should be -- micro -- |
| Column 8, line 33 | "shift" should be -- shifter -- |
| Column 9, line 47 | "inerface" should be -- interface -- |
| Column 11, line 22 | "sevice" should be -- service -- |
| Column 11, line 38 | "firt" should be -- first -- |
| Column 11, line 48 | "12bit" should be -- 12-bit -- |
| Column 13, line 58 | "of" should be -- on -- |

UNITED STATES PATENT OFFICE
CERTIFICATE OF CORRECTION

Patent No. 4,038,533   Dated 7/26/77

Inventor(s) Ernst Dummermuth et al

It is certified that error appears in the above-identified patent and that said Letters Patent are hereby corrected as shown below:

PAGE TWO OF FOUR

| | |
|---|---|
| Column 14, line 41 | delete first occurrence of "type" |
| Column 17, line 60 | "6 5 4 3 2 1 0" should be -- 7 6 5 4 3 2 1 0 -- |
| Column 19, line 48 | "117" should be -- 177 -- |
| Column 19, line 58 | "177" should be -- 175 -- |
| Column 21, line 30 | "MICOR" should be -- MICRO -- |
| Column 21, line 49 | "coupled" should be -- coupling -- |
| Column 27, 2nd chart heading | "Mnemoic" should be -- Mnemonic -- |
| Column 29, line 52 | after "resulting" insert -- program -- |
| Column 30, line 58 | "micro" should be -- macro -- |
| Column 30, line 66 | "removed" should be -- received -- |
| Column 32, line 6 | "an" should be -- the -- |

UNITED STATES PATENT OFFICE
CERTIFICATE OF CORRECTION

Patent No. 4,038,533                Dated 7/26/77

Inventor(s) Ernst Dummermuth et al

It is certified that error appears in the above-identified patent and that said Letters Patent are hereby corrected as shown below:

PAGE THREE OF FOUR

| | |
|---|---|
| Column 32, line 64 | "macro" should be -- micro -- |
| Column 33, line 14 | "of" should be -- to -- |
| Column 33, line 38 | "macro" should be -- micro -- |
| Column 34, line 19 | after "ABT" insert -- R9 -- |
| Column 34, line 44 | "192" should be -- 182 -- |
| Column 34, line 55 | "1" should be -- one -- |
| Column 34, line 57 | "0" should be -- zero -- |
| Column 38, line 10 | "run" should be -- rung -- |
| Column 43, line 7 | "bioplar" should be -- bipolar -- |
| Column 46, Claim 7 line 3 | "illustrations" should be -- instructions -- |
| Column 46, Claim 12 line 61 | after "processor" insert -- for -- |

UNITED STATES PATENT OFFICE
CERTIFICATE OF CORRECTION

Patent No. 4,038,533           Dated 7/26/77

Inventor(s) Ernst Dummermuth et al

It is certified that error appears in the above-identified patent and that said Letters Patent are hereby corrected as shown below:

PAGE FOUR OF FOUR

Column 48, Claim 16
    line 38          after "table;" insert -- each --

Signed and Sealed this

Thirteenth Day of December 1977

[SEAL]

Attest:

RUTH C. MASON
Attesting Officer

LUTRELLE F. PARKER
Acting Commissioner of Patents and Trademarks

Disclaimer 4,038,533.—*Ernst H. Dummermuth*, Chesterland, *William A. Donze*, Mentor, and *Timothy Bielawski*, Maple Heights Ohio. INDUSTRIAL CONTROL PROCESSOR SYSTEM. Patent dated July 27, 1977. Disclaimer filed Jan. 8, 1979, by the assignee, *Allen-Bradley Company*.

Hereby enters this disclaimer to claims 14, 15, 16, 17, 21 and 22 of said patent.

[*Official Gazette June 19, 1979.*]

UNITED STATES PATENT AND TRADEMARK OFFICE
Certificate

Patent No. 4,038,533                  Patented July 26, 1977

Ernst H. Dummermuth, William A. Donze & Timothy Bielawski

Application having been made by Ernst H. Dummermuth, William A. Donze and Timothy Bielawski, the inventors named in the patent above identified, and Allen-Bradley Co., Milwaukee, Wis., a corporation of Wis., the assignee, for the issuance of a certificate under the provisions of Title 35, Section 256, of the United States Code, deleting the names of William A. Donze and Timothy Bielawski as joint inventors, and a showing and proof of facts satisfying the requirements of the said section having been submitted, it is this 5th day of Apr. 1983, certified that the names of the said William A. Donze and Timothy Bielawski are hereby deleted from the said patent as joint inventors with the said Ernst H. Dummermuth.

Fred W. Sherling,
*Associate Solicitor*